(12) United States Patent
Garcia et al.

(10) Patent No.: US 9,872,482 B2
(45) Date of Patent: Jan. 23, 2018

(54) SYSTEMS AND METHODS FOR ANALYZING AND MONITORING ALLIGATOR GROWTH

(71) Applicant: ClicRweight, LLC, Tampa, FL (US)

(72) Inventors: Dorian Garcia, Tampa, FL (US); Joseph A. Spicola, Jr., Tampa, FL (US); Joseph A. Spicola, Sr., Tampa, FL (US)

(73) Assignee: ClicRweight, LLC, Tampa, FL (US)

( * ) Notice: Subject to any disclaimer, the term of this patent is extended or adjusted under 35 U.S.C. 154(b) by 36 days.

(21) Appl. No.: 15/169,098

(22) Filed: May 31, 2016

(65) Prior Publication Data

US 2016/0358342 A1    Dec. 8, 2016

Related U.S. Application Data

(60) Provisional application No. 62/168,583, filed on May 29, 2015.

(51) Int. Cl.

| G06K 9/00 | (2006.01) |
|---|---|
| A01K 29/00 | (2006.01) |
| H04N 5/225 | (2006.01) |
| G06K 9/52 | (2006.01) |
| G06T 7/60 | (2017.01) |
| G06T 7/11 | (2017.01) |
| G06T 7/194 | (2017.01) |

(52) U.S. Cl.
CPC ........ *A01K 29/005* (2013.01); *G06K 9/00369* (2013.01); *G06K 9/52* (2013.01); *G06T 7/11* (2017.01); *G06T 7/194* (2017.01); *G06T 7/60* (2013.01); *H04N 5/2252* (2013.01)

(58) Field of Classification Search
None
See application file for complete search history.

(56) References Cited

U.S. PATENT DOCUMENTS

| 8,588,476 B1* | 11/2013 | Spicola, Jr. | G01G 9/00 348/61 |
|---|---|---|---|
| 2011/0196661 A1* | 8/2011 | Spicola | A01K 29/00 703/11 |
| 2013/0064432 A1* | 3/2013 | Banhazi | G06T 7/0083 382/110 |
| 2014/0140582 A1* | 5/2014 | Spicola, Jr. | A01K 29/005 382/110 |
| 2016/0012278 A1* | 1/2016 | Banhazi | A01K 29/00 382/110 |

FOREIGN PATENT DOCUMENTS

WO    WO 2014197631 A1 * 12/2014    ........... A01K 11/008

* cited by examiner

Primary Examiner — Vu Le
Assistant Examiner — Samah Beg
(74) Attorney, Agent, or Firm — Proskauer Rose LLP

(57) ABSTRACT

Described herein are methods and systems for determining one or more dimensions of an alligator based upon an image. A sensor coupled to a computing device captures an image of an alligator. The computing device extracts a portion of the image that corresponds to a silhouette of the alligator and determines a contour of the silhouette. The computing device transforms the contour to a predetermined position and/or rotation and determines one or more dimensions of the alligator based upon the transformed contour.

10 Claims, 27 Drawing Sheets

SYSTEMS AND METHODS FOR ANALYZING AND MONITORING ALLIGATOR GROWTH

RELATED APPLICATIONS

This application claims priority to U.S. Provisional Patent Application No. 62/168,583, filed on May 29, 2015.

TECHNICAL FIELD

This application relates generally to methods and apparatuses, including computer program products, for analyzing and monitoring alligator growth.

BACKGROUND

Imaging technology, such as ClicRweight®, available from clicRTechnologies of Tampa, Fla., can detect size, length and multiple data points to provide the weight and dimensions of an animal. The system utilizes imaging technology to track the weight of animals and mark them when they are ready for market. The information is wirelessly transmitted to a central processing unit where an algorithm accurately calculates the animal's weight and uploads it to the central database. The data can be reviewed remotely or at the barn through a graphical user interface (GUI).

However, there are particular considerations to take into account when using such technology to analyze alligators versus other animals, such as swine. First, the alligator growth cycle extends approximately twelve months, versus four to five months for swine in a finishing farm. The significance of this is that the size and weight gain of swine over that time period is significant as compared with alligators such that incremental changes to swine are measured in days. With alligators, gains in size and weight are measured in weeks. The following includes details regarding an exemplary alligator growth cycle:—

1. Alligator Growth Cycle—Nature's Cycle 11 to 12 months
   a. July—Collect eggs from swamps
      i. Approximately 28 eggs per nest
      ii. Collected from Louisiana, Florida
      iii. Collected eggs are marked to indicate top so that egg is not turned to prevent embryo from being dethatched from shell [that causes death]
      iv. Eggs stored in cages with swamp grass; incubated in barn
      v. Eggs are not stored, organized for raising by state or county of origin, though most farmers track survival from various geographies/land.
   b. August through mid-September—Incubate, hatch eggs, move to tanks
   c. September to June-October—Grow and harvest. Most gators are ready to harvest June-August, but egg collection, hatching and live season interfere with harvest schedules.
2. Alligator Measurements
   a. Hatchlings approximate 10 inches
   b. Target length at harvest for watchstrap size animals—40 inches to 48 inches
   c. Target hide width—22 to 24 centimeters; measured at the fifth scoot
   d. Alligator Weight at Harvest—12 pounds to 13 pounds
3. Farming and Growth Characteristics
   a. Animals generally grow in uniform fashion, size, length, weight
   b. Animals grow in the dark, no light
      i. Alligators are not grouped by place of origin, state, county
      ii. Alligator growth not evaluated by place of origin, state, county
   c. Tanks
      i. Generally 8 to 36 inches deep, but configuration varies barn to barn
      ii. Approximately 250 (100-500) alligators per tank depending on configuration
      iii. Can have a shelf or floating platforms for feeding
   d. Barns
      i. Size and shape vary within a farm, and farm to farm
      ii. Number of tanks and animals per barn varies
   e. Water changed out anywhere from every day to every third day
   f. Air not vented or changed out
   g. Alligator behavior
      i. Docile over 90% of the time
      ii. Fighting TBD %
      iii. Fighting is main cause of hide blemishes
   h. Animals fed daily
      i. Is feed dispensed by hand, workers tossing feed into each tank with a bucket
      ii. Feed is extruded pellets
      iii. Fed 1-2 times per day depending on farm
   i. Animal survival rate
      i. Wild—12%
      ii. Farms—95%
         1. From eggs and hatchlings
         2. In tanks from handling, fighting, issues with water and air quality, illness
   j. Animals are harvested by hand
      i. Employees enter the tanks and select alligators by hand
      ii. Alligator is measured by laying it on a measuring board attached to each tank
      iii. Alligators too small put back in tank
      iv. Harvest cycle is generally 3 to 4 months
   k. Farmers always harvest on site, though there are wholesale hide dealers. Hides are then marketed by farmer or wholesaler to tannery market.
      i. Hides are individually tagged upon harvest
      ii. Hides are packed in salt in large crates
4. Business
   a. Egg cost—$25 to $65 each (rumors of up to $100 in FL this year)
   b. Pricing negotiated and set with tanneries in February each year
      i. Tanneries in Malaysia, Singapore
      ii. Gucci, Prada, Louis Vuitton
      iii. Typical price for hides—$5-$7/cm for watchstrap gators
   c. Price realization, hide quality rating

| i. | 100% - 1 - No Blemishes | 65% of animals raised |
| --- | --- | --- |
| ii. | 75% - 2 - Some Blemishes | 23% of animals raised |
| iii. | 50% - 3 - Many Blemishes | 12% of animals raised | d. Alligators returned to the wild—12% of animals, typically #3 quality rated
   e. Alligator Meat
      i. 25% to 35% of animal weight at harvest
      ii. Ex: 12 to 13 pound animal yields 3.0 lbs. to 4.55 lbs. of salable meat
      iii. Typical prices for alligator meat—$3.50 to $4.50 per lbs. for carcass weight f. Mature alligators purchased from the wild
  i. Low frequency, done as an accommodation with egg collectors
  ii. Revenue
    1. Primary—Hides; typically larger hides with many blemishes from the wild. These hides are still very valuable because they are large.
    2. Secondary—Meat A second important consideration is the number of animals raised in a growth cycle and the need to measure them individually. A typical finishing barn for swine produces 1,200 animals per cycle, while alligator barn production can approach 5,000 animals per cycle. Further, the rate of growth, size and shape of swine during the cycle and at harvest varies significantly. This necessitates measuring each animal individually using RFID tags and related technology, which is not needed with alligators.

SUMMARY

The methods and systems described herein capture image scans and determine alligator width, length and weight on a daily basis. At the same time, the methods and systems monitor and collect data on air and water quality for temperature, humidity, PH, salinity and ammonia. The monitoring system is used for early detection and correction of conditions that are adverse to alligator health. And in conjunction with measuring growth, the methods and systems collect environmental information that can be correlated with feed and water replenishment to identify trends and relationships that can be used to improve farming methods.

There are important similarities between swine and alligator farming that begin with animal production goals and the fundamental barn and tank configuration used to grow the animals. Animals are raised to targets, either weights, dimensions, or both. Those targets can be built into the ClicRweight® system to facilitate animal monitoring and decision-making during production. Swine are raised in pens, alligators in tanks. Being in a confined area facilitates a solution that can isolate an individual animal to capture images. Barns provide a stable environment with constants for light, temperature, humidity and airborne particulate. The predictability of the environment enables system calibrations to be established with minimal adjustment.

The invention, in one aspect, features a method for determining one or more dimensions of an alligator based upon an image. A sensor coupled to a computing device and housed in a chute assembly captures an image of an alligator positioned on an illuminated bed of the chute assembly. The computing device extracts a portion of the image that corresponds to a silhouette of the alligator and determines a contour of the silhouette. The computing device transforms the contour to a predetermined position and/or rotation and determines one or more dimensions of the alligator based upon the transformed contour.

The invention, in another aspect, features a system for determining one or more dimensions of an alligator based upon an image. The system comprises a sensor coupled to a computing device and housed in a chute assembly that captures an image of an alligator positioned on an illuminated bed of the chute assembly. The computing device extracts a portion of the image that corresponds to a silhouette of the alligator and determines a contour of the silhouette. The computing device transforms the contour to a predetermined position and/or rotation and determines one or more dimensions of the alligator based upon the transformed contour.

The invention, in another aspect, features a chute assembly for capturing images of an alligator. The chute assembly comprises a base, a ceiling, and a plurality of guides connecting the base and the ceiling, each guide comprising a support attached to the base and a concentric, free-moving cylinder attached to the ceiling. The chute assembly further comprises a bed attached to the plurality of guides and positioned between the ceiling and the base, the bed including one or more floats attached to an underside of the bed, where the floats operate to keep the bed at a waterline when the chute assembly is placed into a water tank, and a camera box attached to the ceiling, the camera box comprising an imaging device coupled to a processor and a memory, the imaging device operable to capture images of the bed.

Any of the above aspects can include one or more of the following features. In some embodiments, the bed includes one or more lights that illuminate a surface of the bed. In some embodiments, the processor is configured to process the images to extract a silhouette of an alligator in the images, determine a contour of the silhouette, transform the contour to a predetermined position and/or rotation, and determine one or more dimensions of the alligator based upon the transformed contour. In some embodiments, the predetermined position and/or orientation is a horizontal body axis with a head of the alligator facing left.

In some embodiments, the contour of the silhouette is determined by classifying one or more pixels of the image that belong to the alligator, classifying one or more pixels of the image that belong to the illuminated bed, and extracting the contour based upon the classified pixels. In some embodiments, the contour is transformed by aligning the contour horizontally, determining a first moment of inertia of silhouette pixels, determining a first moment of inertia of contour pixels, and rotating the contour 180 degrees if the first moment of inertia of the silhouette pixels is not to the left of the first moment of inertia of the contour pixels. In some embodiments, the one or more dimensions comprise a length of the centerline of the alligator, a width of the alligator, and a length of one or more limbs of the alligator. In some embodiments, the computing device determines a weight of the alligator based upon the dimensions.

BRIEF DESCRIPTION OF THE DRAWINGS

FIG. 10 is a screenshot of an exemplary farm report of the GUI reporting tool.

FIG. 12 is a screenshot of an exemplary tank report of the GUI reporting tool.

DETAILED DESCRIPTION

The methods and systems for analyzing and monitoring alligator growth are described in detail below. The hardware and device assembly used in the barn for capturing images of the alligators comprises a scanning station, a sensor (e.g., a camera or other imaging apparatus), an in-tank water sensor, and a barn control module.

There are three principal elements incorporated in the methods and systems described herein:

1. Embedded System

Figure 1A:
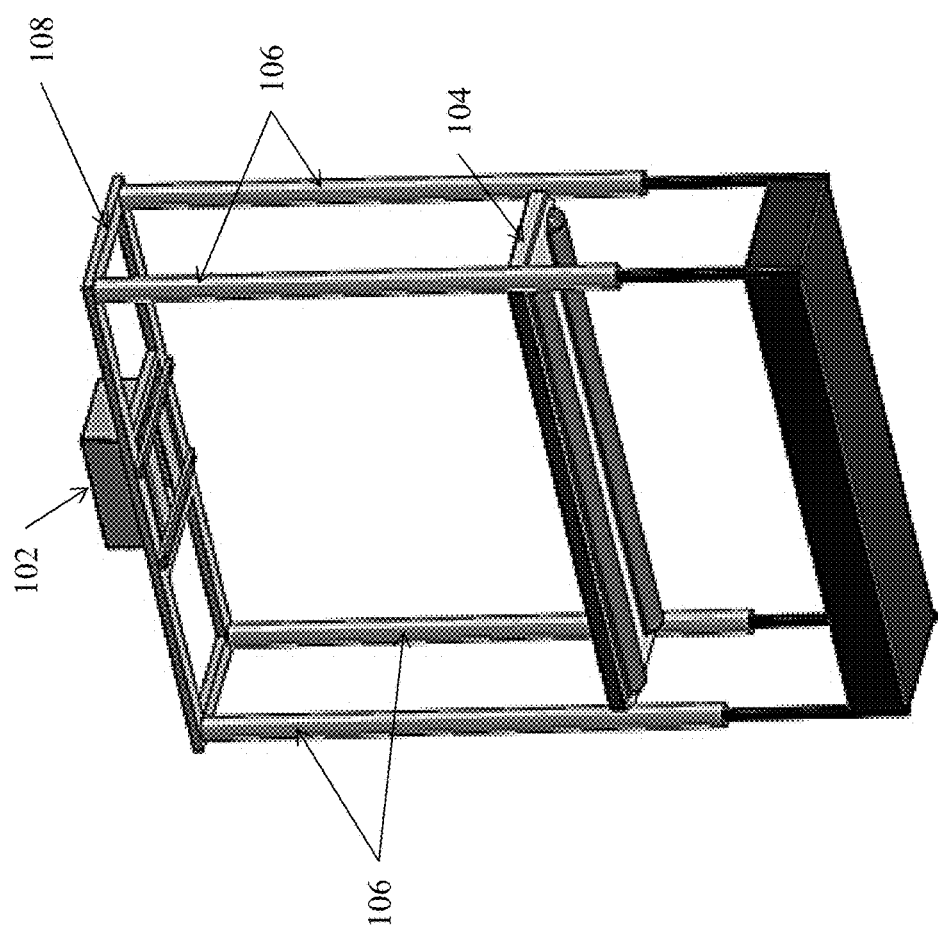
FIG. 1A is a perspective view diagram of a chute assembly.
Figure 1B:
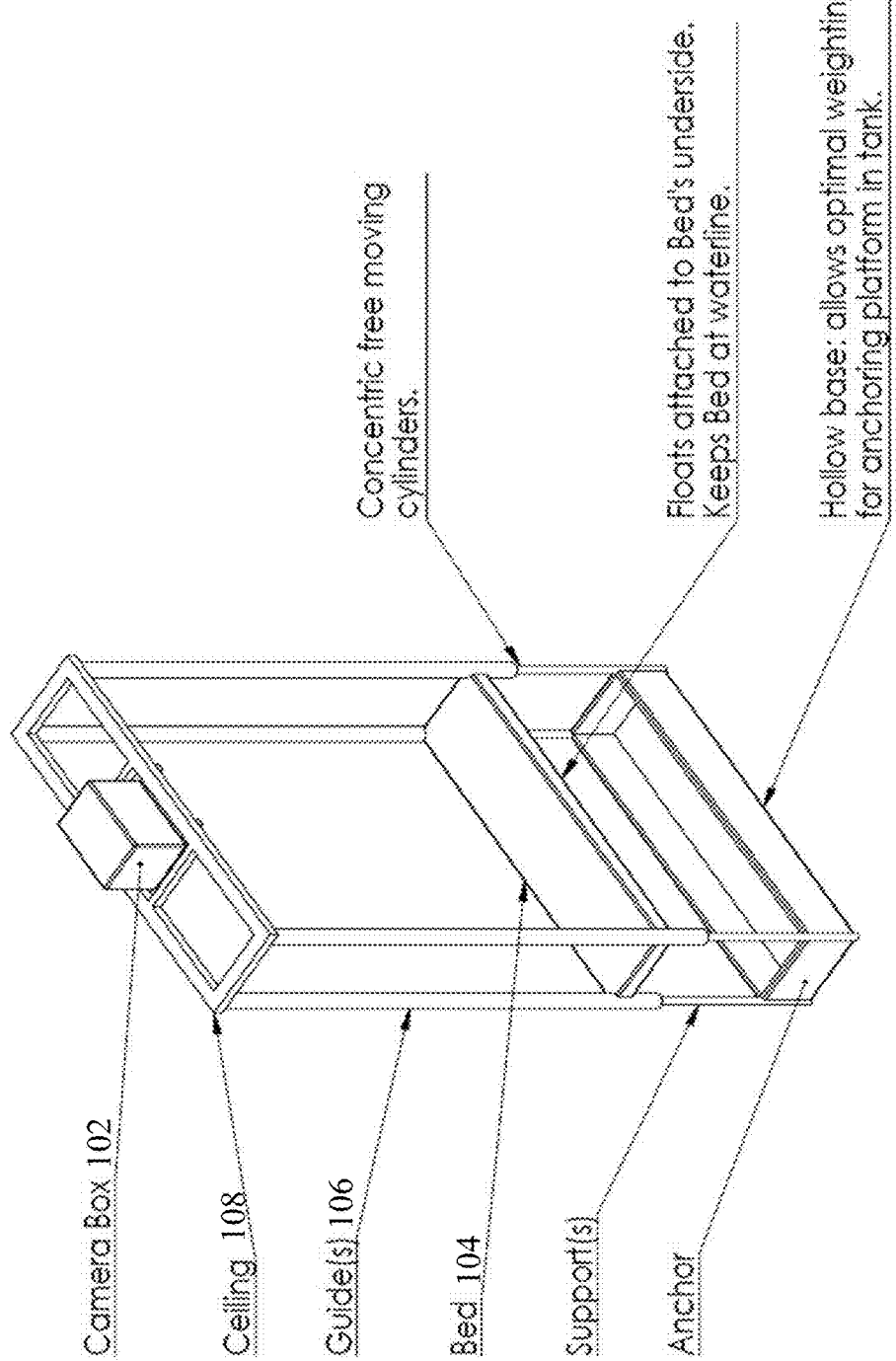
FIG. 1B is another perspective view diagram of the chute assembly.
Figure 1C:
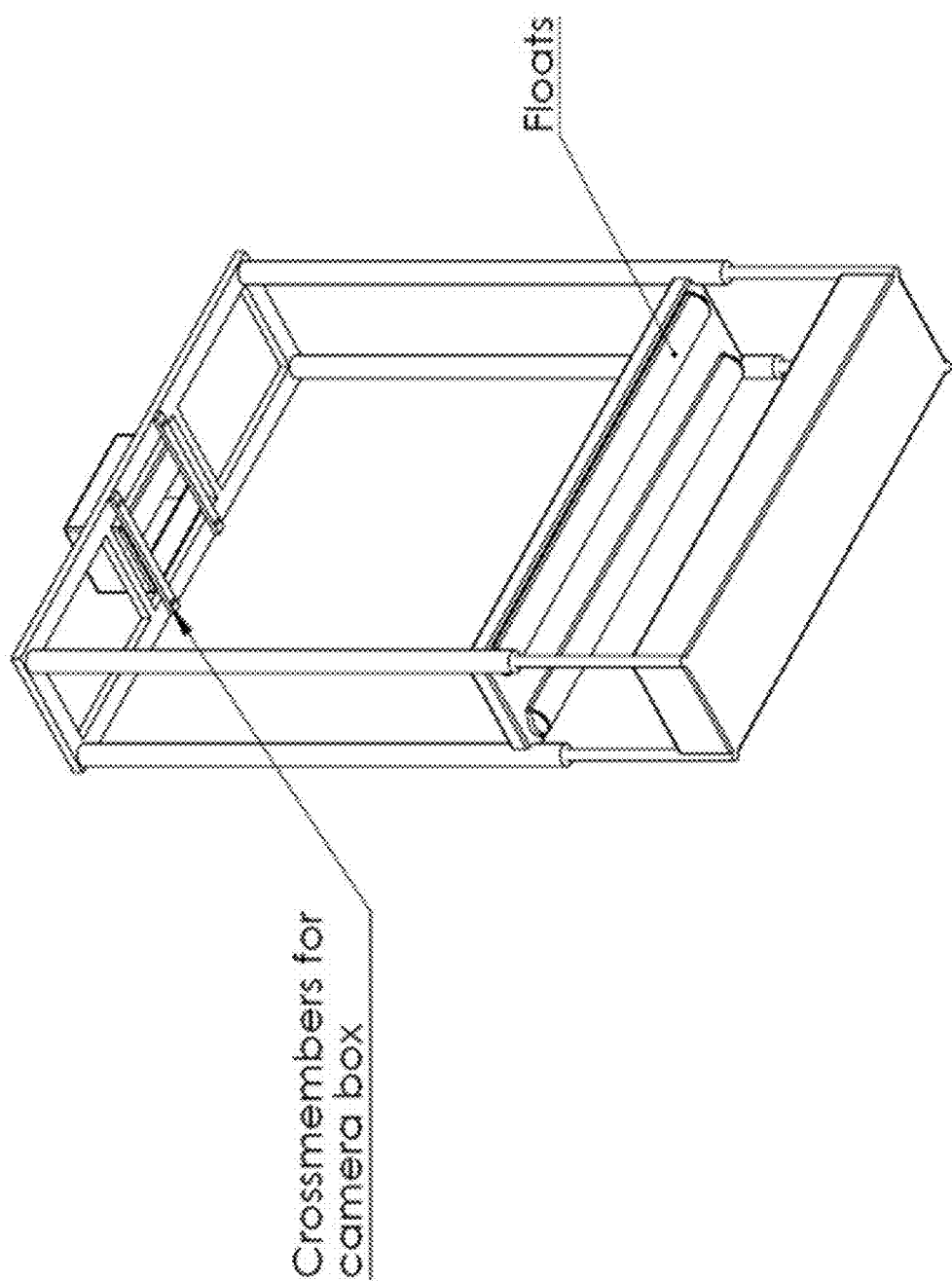
FIG. 1C is another perspective view diagram of the chute assembly.

The embedded system is comprised of the hardware and software installed in each barn. To collect animal growth information, a chute assembly 100 (as depicted in FIGS. 1A, 1B, and 1C) is installed in a representative sample of tanks in each barn. As alligators enter the chute assembly 100 and are positioned on the bed 104 (which can be illuminated), a sensor located in a camera box 102 captures images of the animals. An exemplary sensor is the GigE monochrome industrial camera available from The Imaging Source Europe GmbH. The images are processed using a measurement and weight algorithm using a computing device installed in the camera box 102. Once the computing device has processed the images to determine weights and measure of the animals in the images, the computing device transmits the data via a communications network (e.g., local, wireless, internet) to one or more server computing devices. Environmental sensors are installed in each sampled tank and in the barn to measure and monitor temperature, humidity, PH, salinity and ammonia. All collected data is stored in the cloud (e.g., in a data warehouse) for reference and analysis.

2. Statistical Modeling

Using data collected from a representative sample of alligators from tanks within a barn, projections for the population of alligators in each barn are determined and then correspondingly, predicted for the farm in total. Statistical sampling is used in lieu of tagging and measuring the progress of individual animals. It is expected that sampling can be relied upon as alligators grow and develop in a relatively uniform manner. Specifically, width, length and weight for alligators is similar enough from animal to animal throughout the growth cycle such that sampling is predictive. The importance of this methodology relates not only to the precision of the system, but also to the cost. Specific identification by animal throughout the growth cycle, for all animals, provides greater levels of precision, however, costs for the required technology are correspondingly higher.

3. GUI Reporting

GUI reporting, such as via the ClicR.GUI™ web-based reporting tool, is available on any Internet-enabled computer and/or mobile device. Information is available at all times and includes a dedicated customer login, as well as information at the farm, barn and tank levels of detail. Available data includes animal measures and environmental information for barns and tanks. The system provides for customer managed access and security and also provides download capability for all historical information from the farm down to the tank levels of detail.

Figure 25:
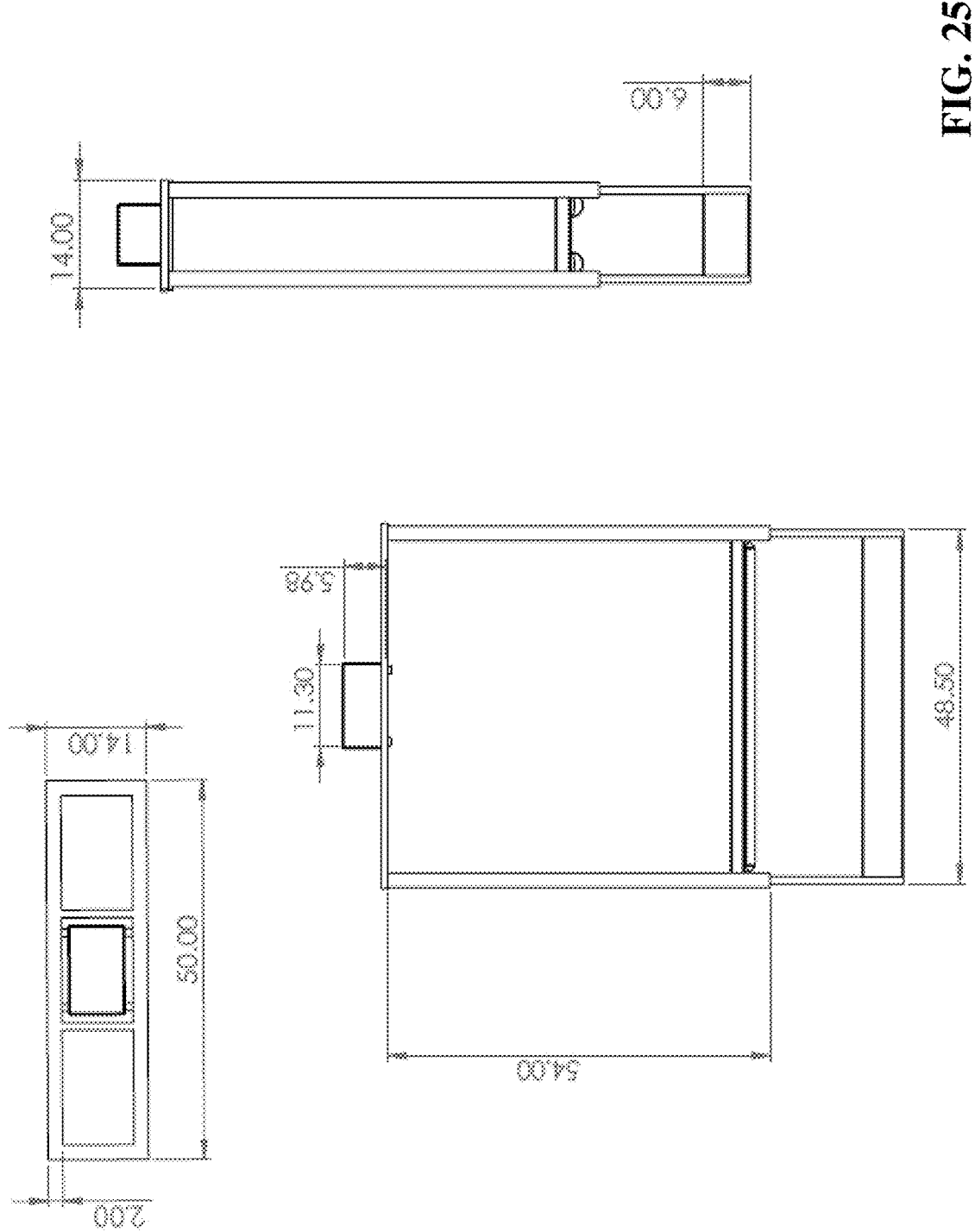
FIG. 25 depicts exemplary engineering drawings of the chute assembly.

As shown in FIGS. 1A, 1B, and 1C, the chute assembly 100 is made from a high-quality frame technology utilizing high-strength stainless steel tubing. The chute is designed to be open and inviting to the alligator in order to improve utilization and coverage. The footprint of the chute assembly 100 occupies approximately twelve cubic feet of space inside the tank. FIG. 25 includes exemplary engineering drawings of the chute assembly 100.

In some embodiments, the chute assembly 100 includes an infrared platform or alternative surface material that results in infrared reflection that may be needed to capture images of alligators. The frame of the chute assembly 100 can be modified to provide flexibility to fit into a variety of barn and tank configurations. Specifically, square, rectangular and round tanks with concrete or vinyl liners may require different brackets to secure the station and different feet to mount the base in the tank. The digital imaging sensor also may be upgraded to withstand the long-term heat, humidity and ammonia effects on the electronics based on how well the sensor in the prototype endures the rigors of the alligator barn.

Figure 2:
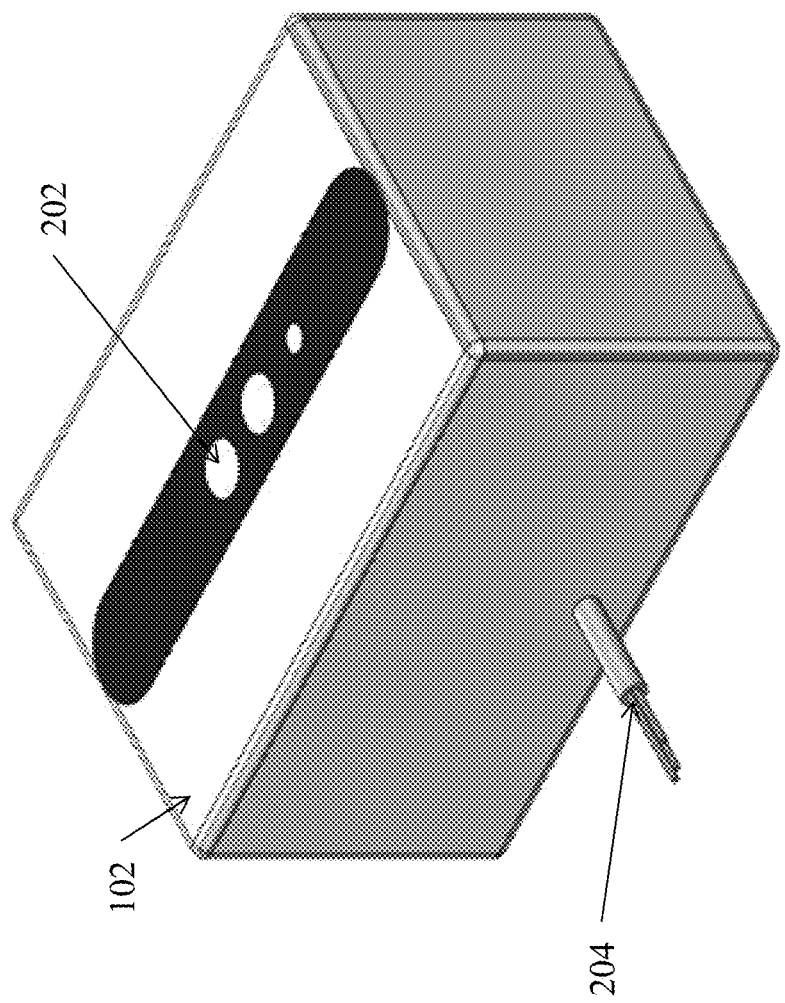
FIG. 2 is a diagram of the camera box of the chute assembly.

Attached to the top of the chute assembly 100 is a camera box 102. FIG. 2 is a bottom view diagram of an exemplary camera box including sensor 202. In addition to housing the sensor 202, the camera box 102 includes computing hardware such as a processor, a memory, and a network interface, and the processor is configured to execute measurement and weight algorithm software to scan, process, collect and transmit data to other computing devices (e.g., cloud servers) using a network connection 204. It should be appreciated that the camera box 102 can be configured with hardware such as an antenna and related circuitry to enable the computing hardware to communicate on the network connection wirelessly.

Figure 3:
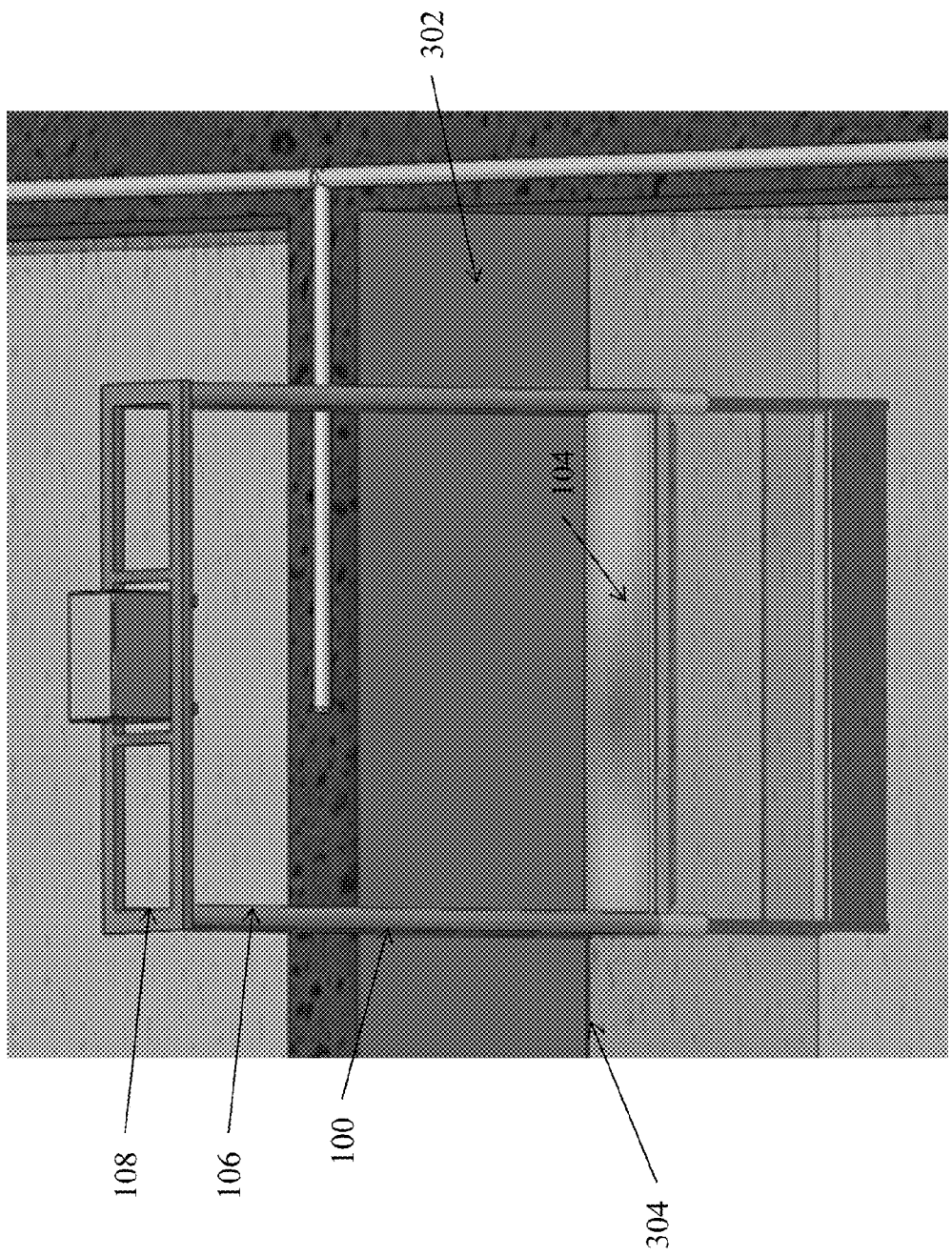
FIG. 3 is a diagram of the chute assembly positioned in a water tank.

FIG. 3 depicts an exemplary chute assembly 100 as positioned inside, e.g., a tank 302 that is located within a barn or other animal enclosure. As shown in FIG. 3, the chute assembly 100 is partially submerged up to the bed 104, with the guides 106, ceiling 108, and camera box 102 above the water level 304.

Figure 4:
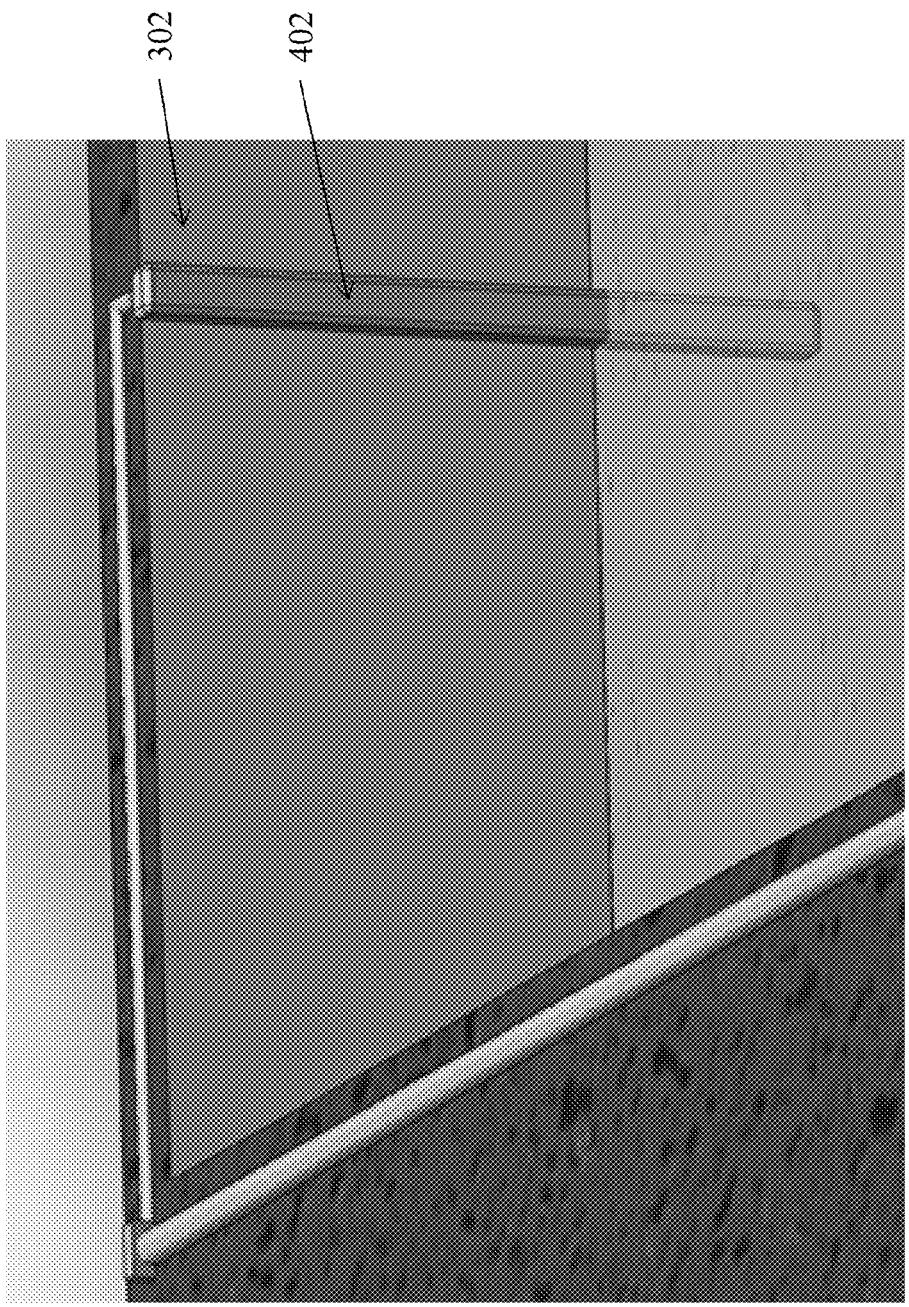
FIG. 4 is a diagram of a water sensor positioned in the water tank.

One or more water sensors 402 (shown in FIG. 4) are mounted in the tank 302 with the chute assembly. Each water sensor 402 collects data relating to temperature, PH and salinity of the water. In some embodiments, each water sensor 402 is housed in an unobtrusive enclosure and is mounted on a sidewall of the tank 302.

The water sensor 402 is part of a sensor platform that is designed around the objectives of monitoring the environmental conditions in the barn to better manage alligator growth. Accordingly, other sensors (not shown) can be included in the barn to monitor air and water quality. The term 'platform' here describes an integrated solution to satisfy such environmental monitoring objectives throughout the barn. The sensor platform includes the sensors themselves, the electronics that integrate and control these devices, the enclosures and communication technologies to report the captured measurements. In some embodiments, the sensors are commercial off-the-shelf products, specified for industrial use in harsh environments. A primary consideration for these devices is durability and reliability. The most critical and sensitive sensors being used are for measuring ammonia in the air and pH in the water.

In some embodiments, there is a single ammonia sensor for the entire barn. The ammonia device selected is an electro-chemical cell based sensor. The sensing equipment is encased in a waterproof plastic to protect the electronics from the environment in the barn. This style of detector is used in industrial environments to detect ammonia leaks in process areas and is a good balance of accuracy, durability, and reliability. The sensor requires periodic maintenance, typically on six-month intervals.

As explained above, water sensors 402 used to measure pH in the water are installed in each tank 302 where there is also a chute assembly 100 installed. Where tanks do not share water that allows for representative measures across the entire barn, there may be a need to install additional sensors. The pH sensor technology is an electrode sensor, designed to be rugged and industrialized. A consideration and tradeoff in selecting high quality sensors is maintenance. As with the selected ammonia sensor, the pH sensor requires constant moisture to ensure a long life. This is relevant in that the routine maintenance in the alligator tank is the periodic flush and replace cycle of the water in the tank. When the tank is drained, maintaining moisture may require a customized enclosure.

Figure 5:
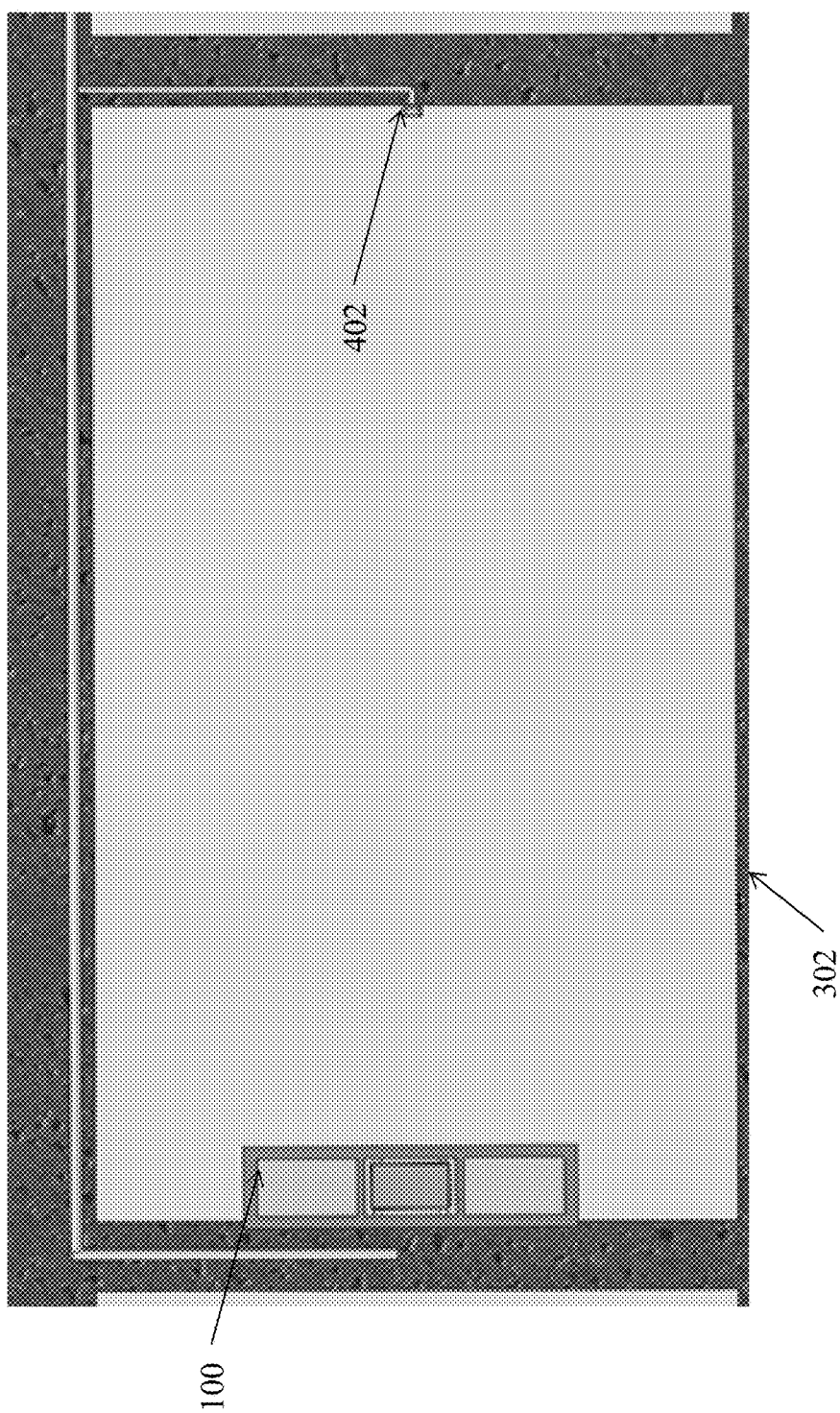
FIG. 5 is a top-down view diagram of the water tank showing the positioning of the chute assembly and the water sensor.

FIG. 5 is an exemplary top-down diagram of the tank 302 showing the installation of a chute assembly 100 and water sensor 402. As shown in FIG. 5, the chute assembly 100 can be designed for installation against a sidewall of the tank 302 to provide accessibility for barn personnel and to facilitate cabling for power, networking (if non-wireless), and the like. The floating bed settles on the surface of the water. Edges of the chute assembly 100 can be rounded and the assembly can be designed to eliminate rough edges or protrusions that could harm the animals.

Figure 6:
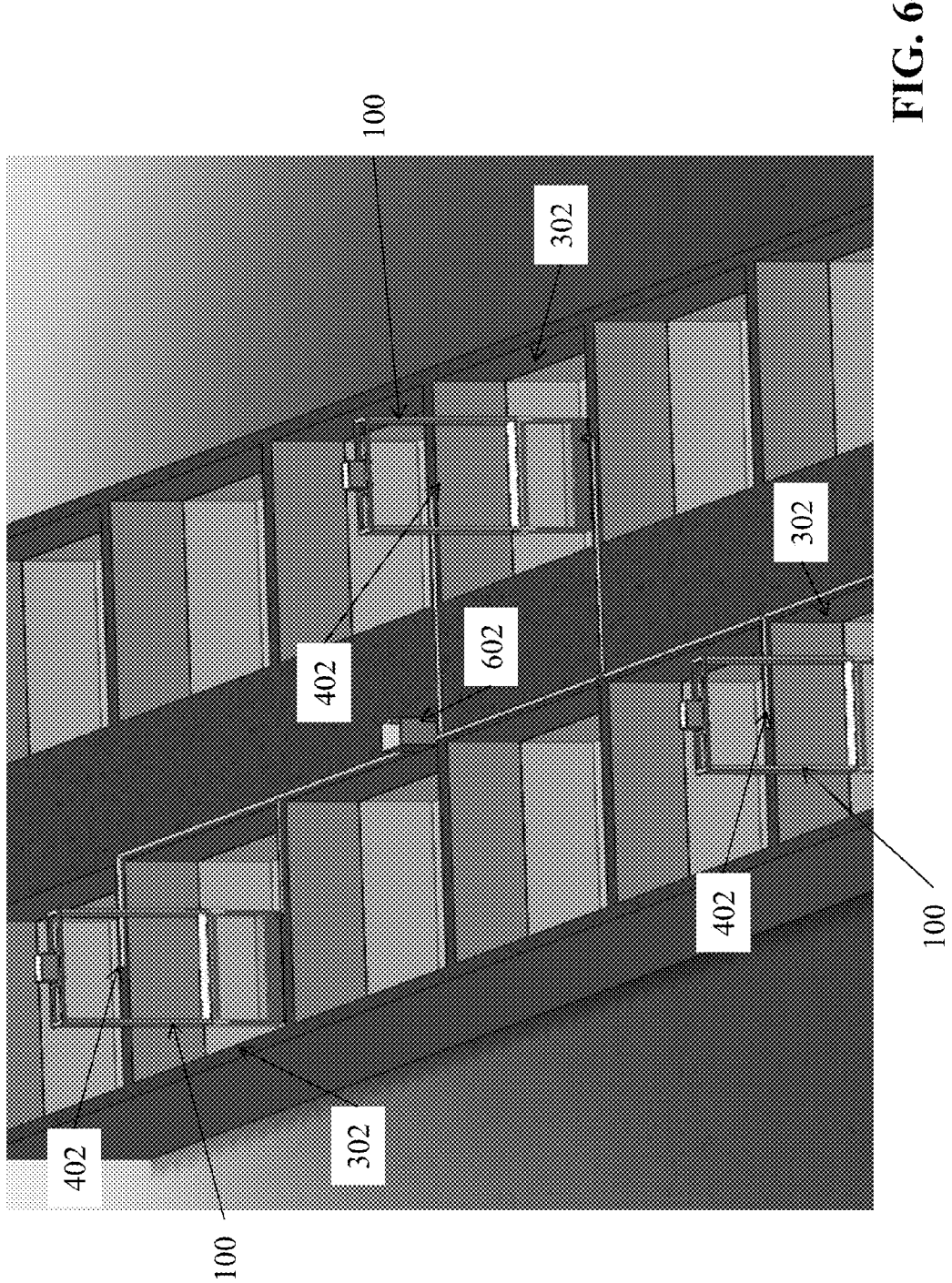
FIG. 6 is a diagram of a barn enclosure showing a plurality of water tanks with chute assemblies and water sensors.

FIG. 6 is an exemplary diagram of a barn having a plurality of chute assemblies 100 and water sensors 402 installed in tanks 302. As shown in FIG. 6, the chute assemblies 100 and water sensors 302 are installed in alternating tanks 302 in the barn and on both sides of the center aisle. Additionally, as barn designs generally lack uniformity, differences in barn and tank configurations may necessitate customization for each assembly. FIG. 6 also depicts a barn control module 602 which is an enclosure, typically positioned in the center of the barn and mounted to the ceiling.

Figure 7:
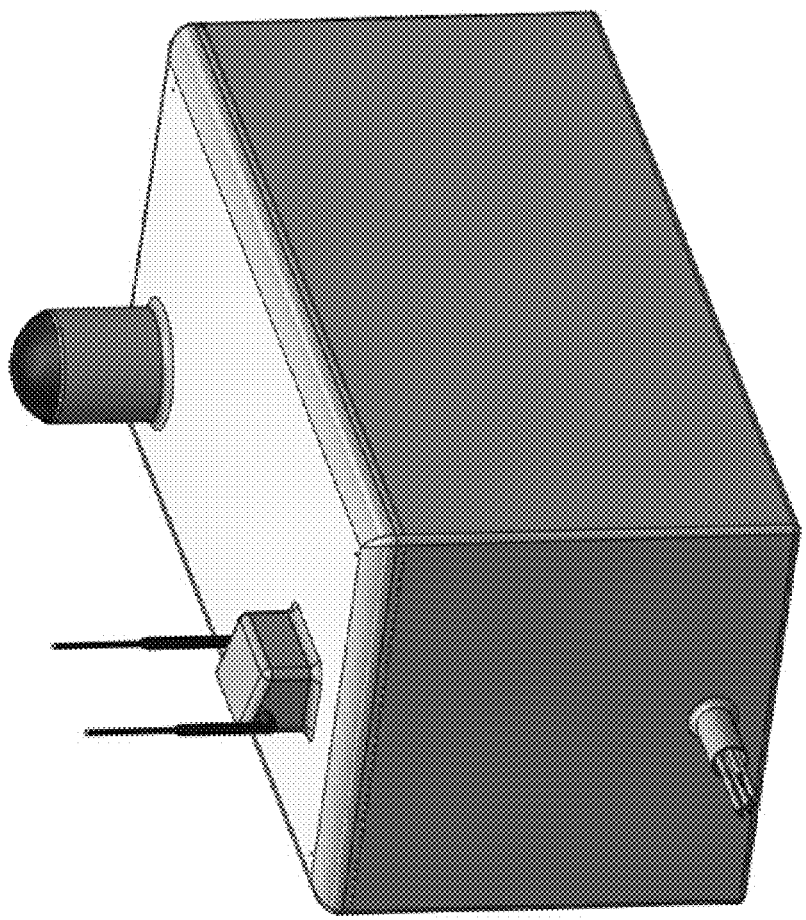
FIG. 7 is a diagram of the barn control module.

FIG. 7 is a detailed block diagram of the barn control module 602. The module 602 houses the main power supply and controller for the sensor platform, including the wireless network circuitry and other sensors that measure ambient temperature and humidity. The power supply consists of a high efficient AC/48 VDC convertor, while the wireless network has superior reliability and data transfer speeds. In some embodiments, the sensor platform uses multiple redundant wireless access points to ensure the platform is constantly functioning—which ensures measures and weights are reliably transmitted to, e.g., a remote computing device for easy viewing and customer reporting.

As previously described, the chute assembly 100 includes a camera box 102 that contains a processor and memory configured to execute software that utilizes the sensor 202 to capture images of the alligators positioned on the bed 104 of the chute assembly, to analyze the captured images, to execute the measurement and weight algorithm against the captured images, and to transmit corresponding measurement data and, in some cases the images themselves to a remote computing device for display in a graphical user interface (GUI) reporting tool that is described in detail below.

As shown in FIGS. 8-12, the GUI reporting tool is accessible from a computer, tablet, smartphone, or other computing device with, e.g., a browser and a network connection to the internet. From the GUI reporting tool, a producer or farmer can view certain data captured by the system, including alligator measurements and average monthly gains in width, length and weight. In addition to simply viewing current data, a farmer can generate history reports for further analysis.

Figure 8:
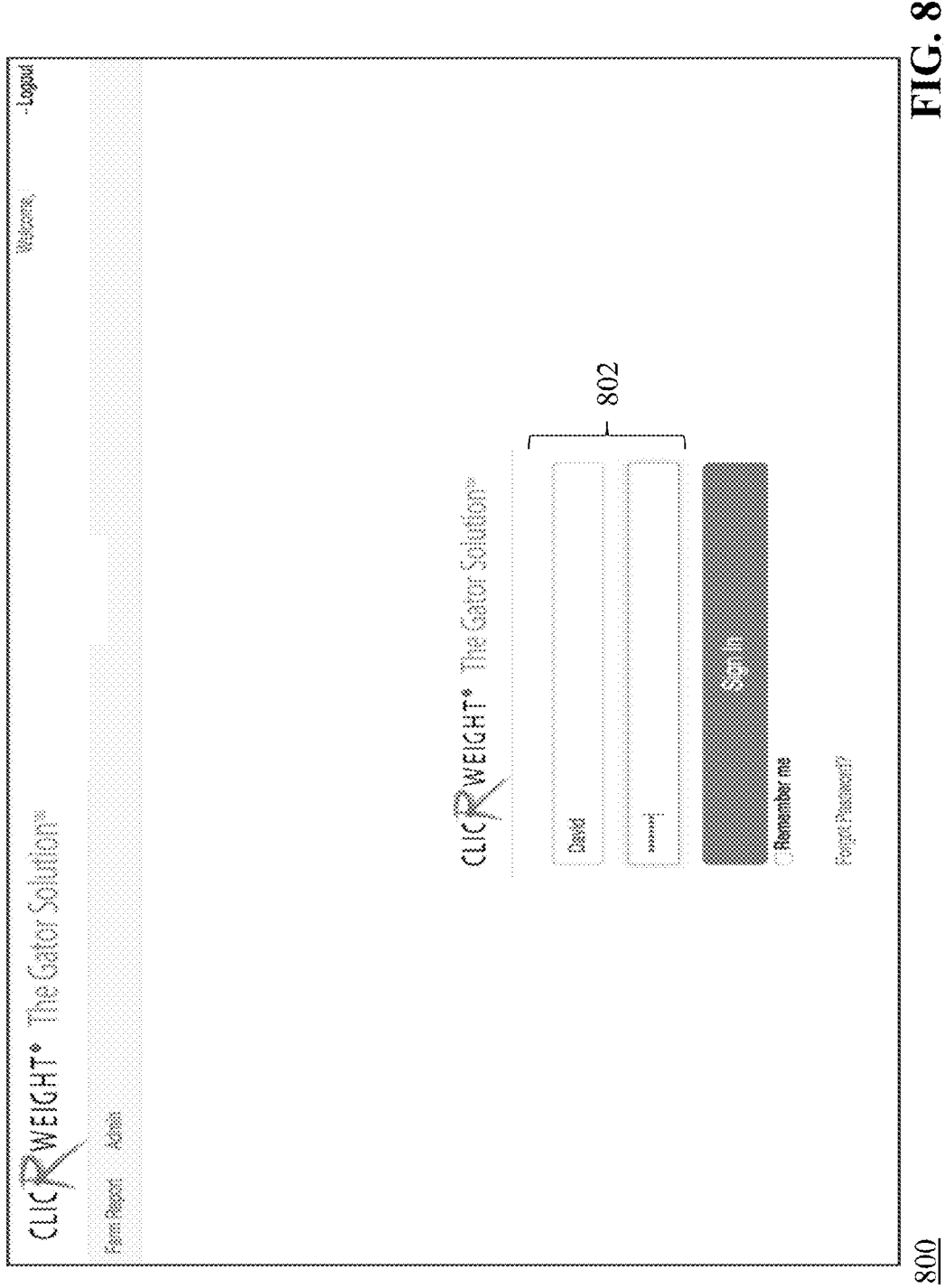
FIG. 8 is a screenshot of an exemplary login screen of a GUI reporting tool.

FIG. 8 is an exemplary login screen 800 of the GUI reporting tool. The login screen 800 includes fields 804 for a user to enter his or her credential information (e.g., username, password) in order to gain access to the data screens of the GUI reporting tool.

Figure 9:
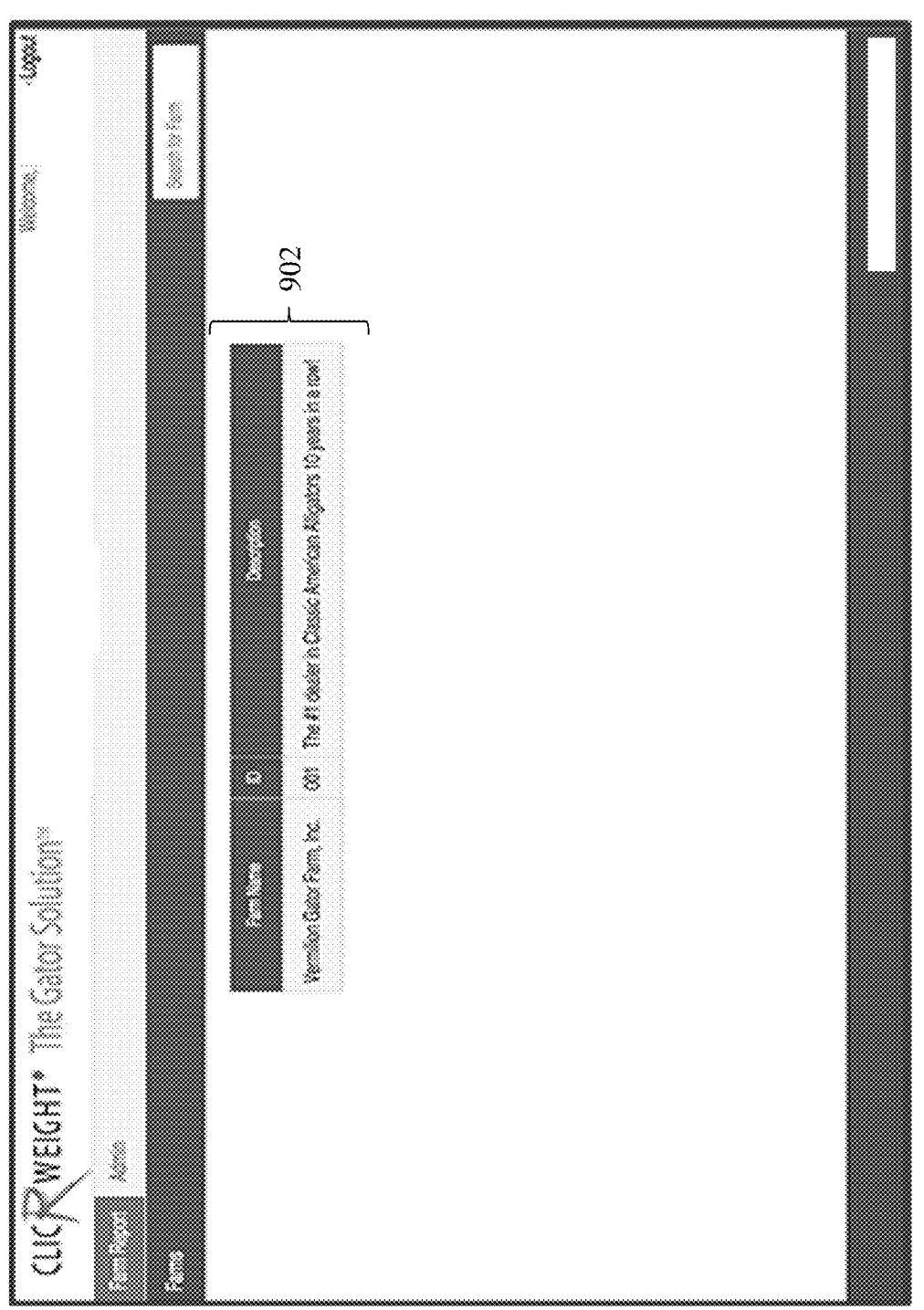
FIG. 9 is a screenshot of an exemplary landing page of the GUI reporting tool.

FIG. 9 is an exemplary landing page 900 of the GUI reporting tool. The landing page 900 appears after login and includes, e.g., a listing of farms 902 that have been set up. This is particularly useful where a producer raises animals in multiple farms, including owned and leased facilities.

Figure 10:
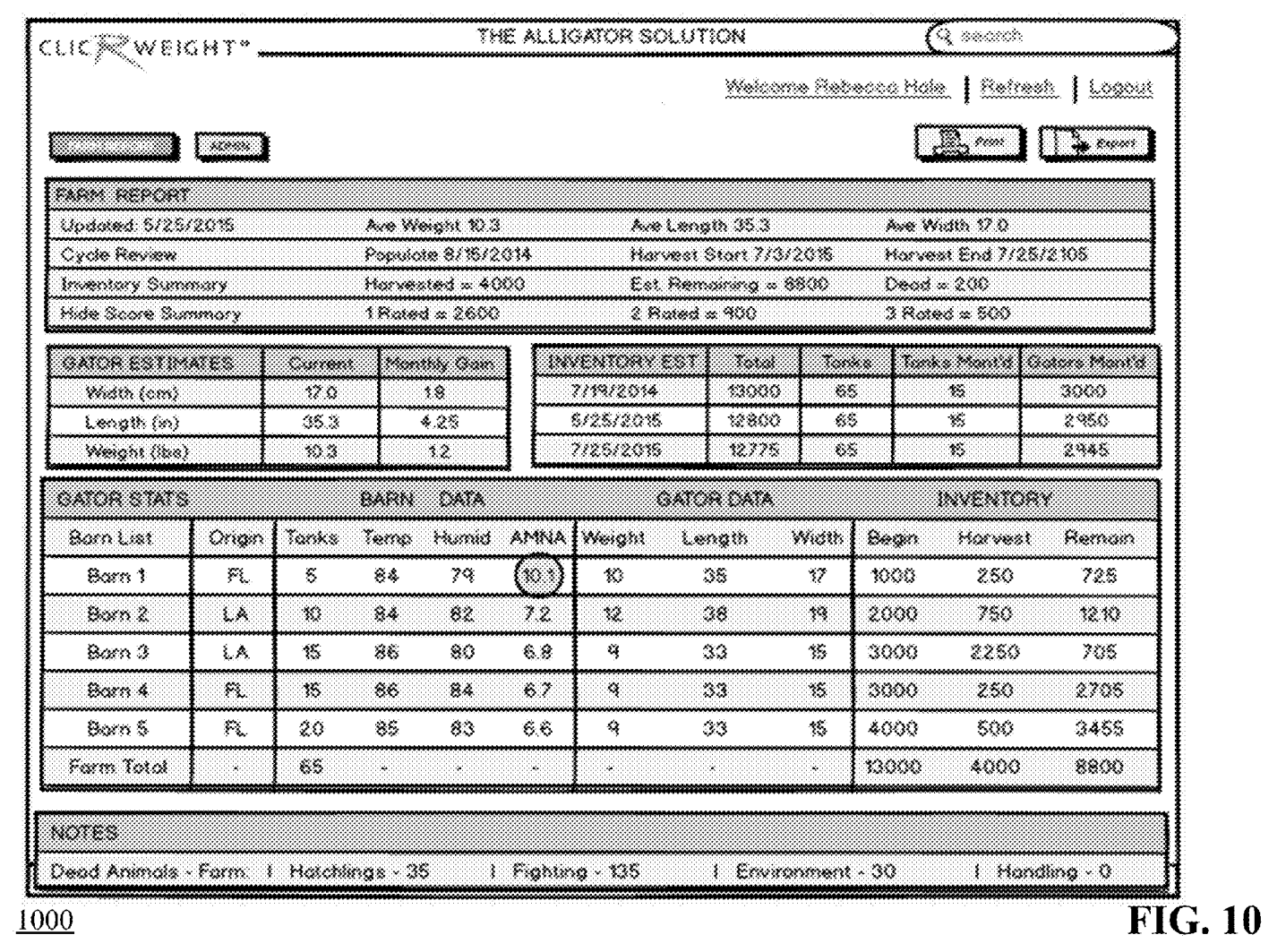

FIG. 10 is an exemplary farm report 1000 of the GUI reporting tool. The farm report 1000 provides a comprehensive view of the activity for the entire farm and within each barn, determined through statistical projections of the population of the alligators being raised by the farm. Estimates are based on projections of alligators being monitored by the system in a small number of tanks in each barn. The system also provides environmental monitoring capabilities that provide alerts of adverse conditions in the barn to enable early detection and correction.

Figure 11:
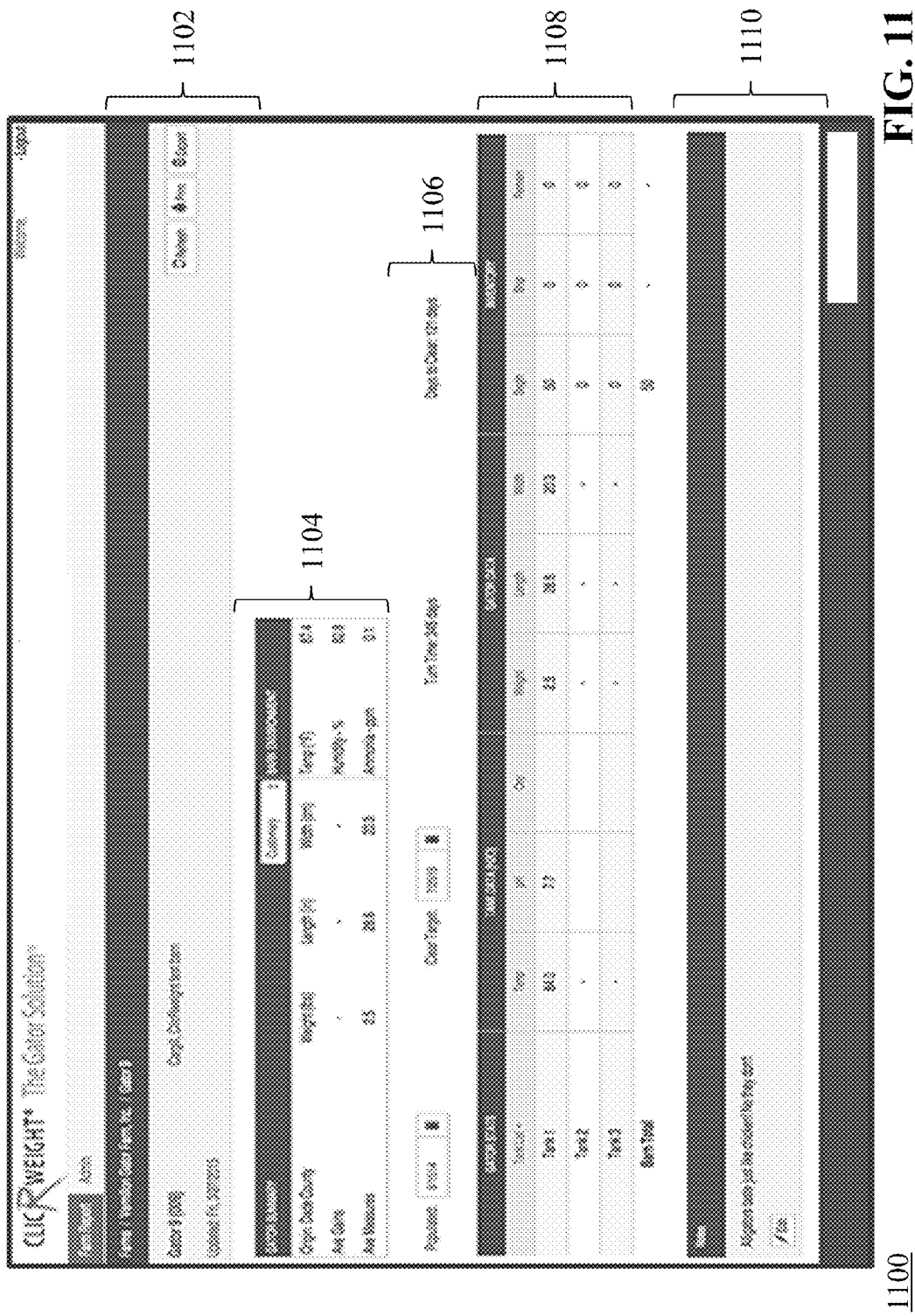
FIG. 11 is a screenshot of an exemplary barn report of the GUI reporting tool.

FIG. 11 is an exemplary barn report 1100 of the GUI reporting tool. The barn report 1100 provides an overview of activity within a specific barn and for the individual tanks being monitored by the system. The barn report includes an Information section 1102 with details such as location, description, dates; a Gator Summary section 1104 that can include reports on the origin of gators in barn, average gains and measures for weight, length and fifth scoot width, and environmental measures; a Growth Cycle section 1106 which tracks the date gators are populated and targeted clear date, a Tank Data section 1108 which includes data on the water environment, gator measures and inventory by tank, and a Notes section 1110 which can contain free-form notes submitted by the user.

Figure 12:
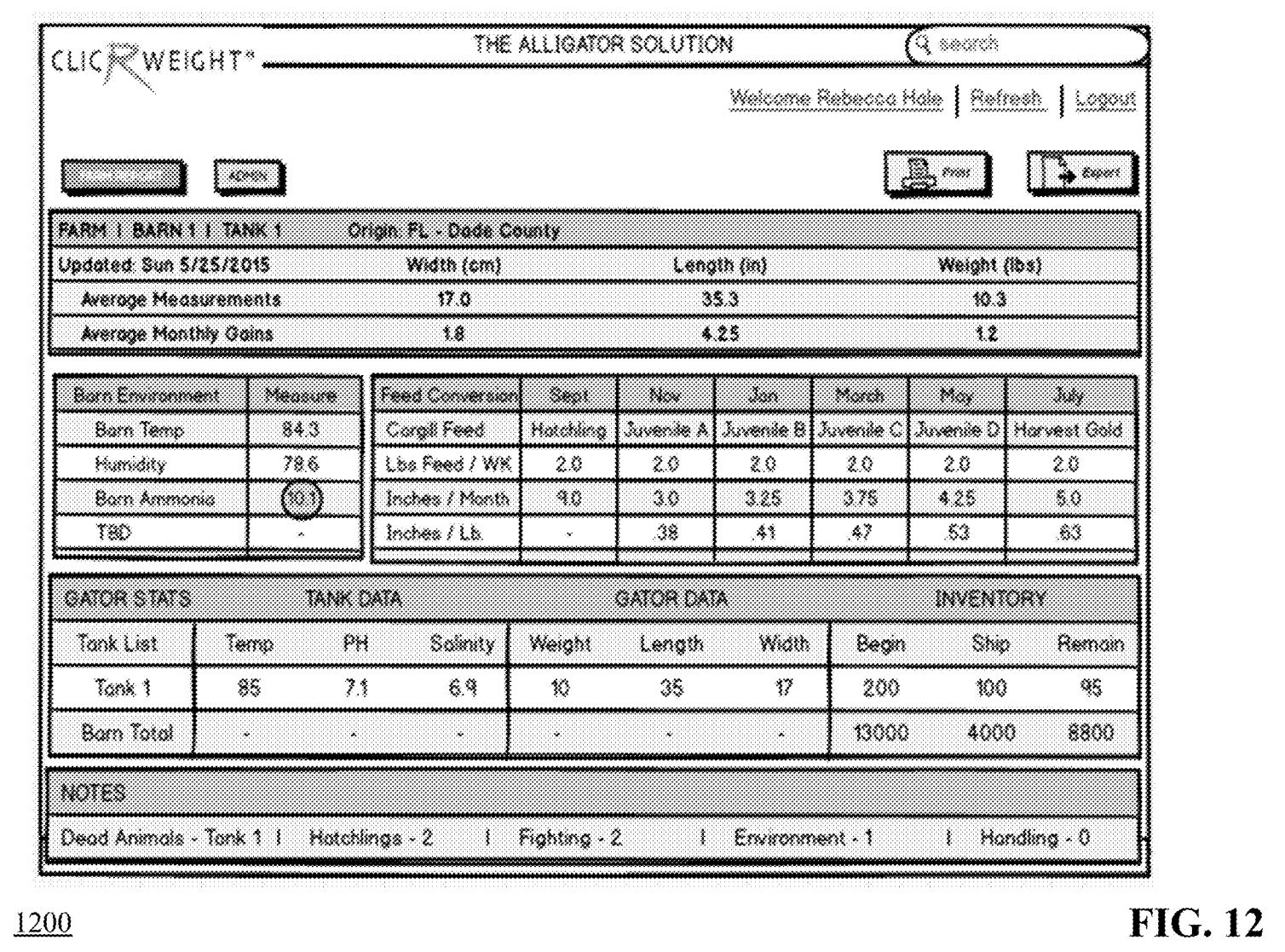

FIG. 12 depicts an exemplary tank report 1200 of the GUI reporting tool. The tank report 1200 provides detail for the activity for a specific tank that is being monitored. The goal of this data reporting is to highlight alligator feed dynamics and conversion information. This report also highlights alerts to adverse environmental conditions in the tank. Such alerts can carry forward to the Barn and Farm reports, respectively.

Figure 13:
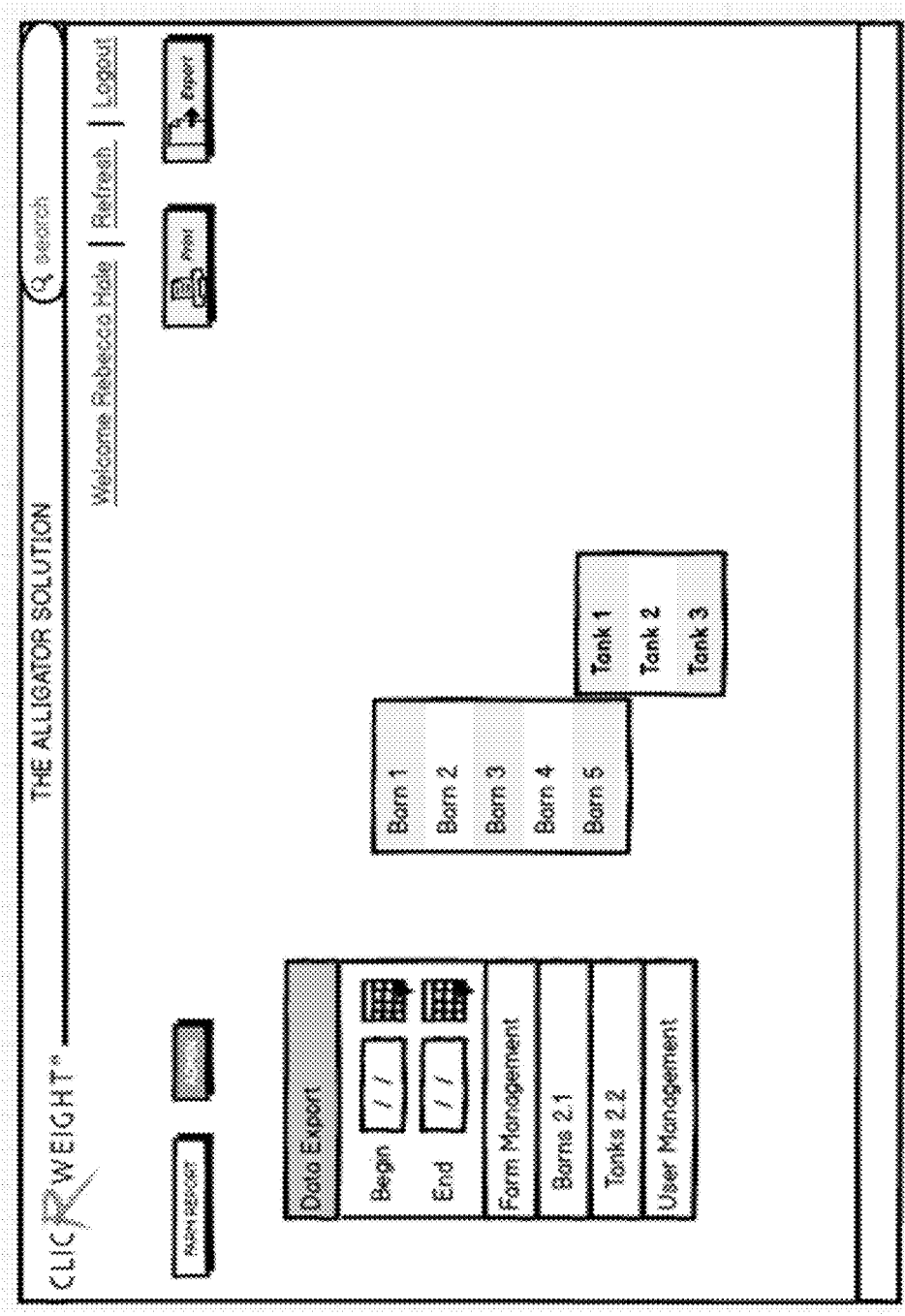
FIG. 13 is a screenshot of an exemplary administration screen of the GUI reporting tool.

FIG. 13 below is an exemplary administration screen 1300 for the GUI reporting tool. For example, each customer can have a master account with administration privileges. Under the master account, the producer or farmer can define worker accounts that have more limited functionality, such as viewing of certain types of data. The administration screen 1300 enables the farmer to manage how the system is used in their operation. It also provides access to the historical data that has been collected by the system for easy downloads into spreadsheet and data base programs.

Precise and reliable imaging of alligators is important to obtaining accurate measurements as described herein. Generally, the hide of an alligator has a reflective property requires adaptations to typical infrared digital imaging sensors. In addition, infrared light-emitting diodes (LEDs) can be installed within the bed 104 of the chute assembly 100 that, when used in conjunction with an infrared sensor 202, create a satisfactory digital image from which the computing device can derive accurate measurements.

Figure 14:
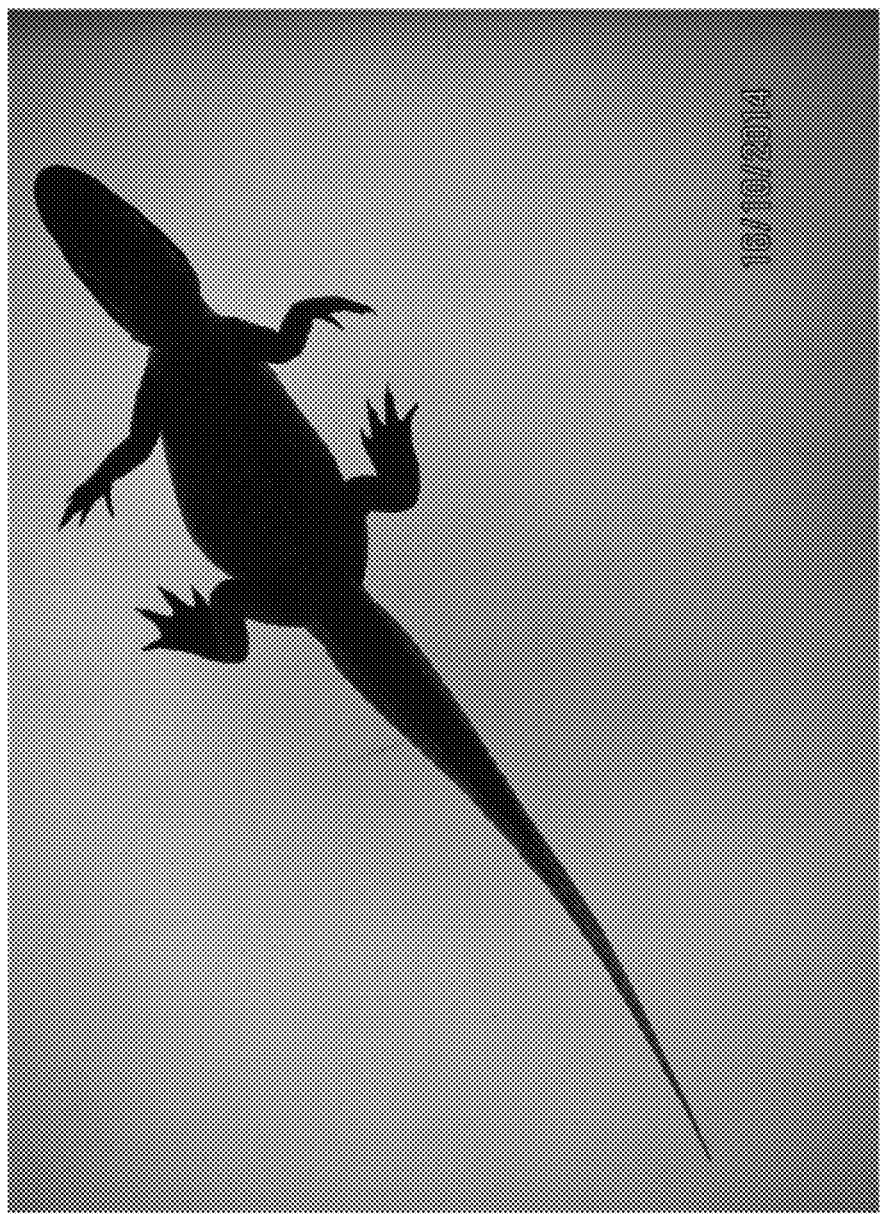
FIG. 14 is an exemplary raw image of an alligator captured by the sensor of the camera box affixed to the chute assembly.

FIG. 14 is an exemplary raw image of an alligator captured by the sensor 202 of the camera box 102 affixed to the chute assembly 100. The raw image in FIG. 14 is then manipulated to isolate the silhouette of the alligator, as is explained in greater detail below.

First, the image processing software executing on the computing device in the camera box 102 performs a segmentation process on the raw image. Before being able to perform any dimensional measurement of an alligator, the animal needs to be extracted from the image(s); that is, the pixels that belong to the animal must be differentiated from the pixels of the bed 104 on which the animal resides. This step is commonly referred to as segmentation.

As mentioned above, the chute assembly 100 uses a backlit bed such that the animal is actually imaged as its shadow, while the rest of the image incorporates the backlit bed. This approach produces a sharply contrasted image in which dark pixels belong to the animal (also called foreground) and light pixels belong to the backlit platform (also called background).

The technique of background subtraction is used to segment the alligator out from the backlit bed. This technique consists of modeling the background (an empty bed) and conceptually subtracting this background model from the image of an alligator. The image of the difference represents the pixels of the alligator, or any foreground opaque object, with non-zero values. Because the imaging process is noisy by nature, the background model is preferably statistical.

A simple statistical model is used for the background: a single Gaussian probability density function (pdf) is used to model the distribution of each individual pixels. Each of these pdf are then estimated by observing a series of images of the background: the bed without any animals on it. This process is called the training phase of the segmentation.

Figure 15:
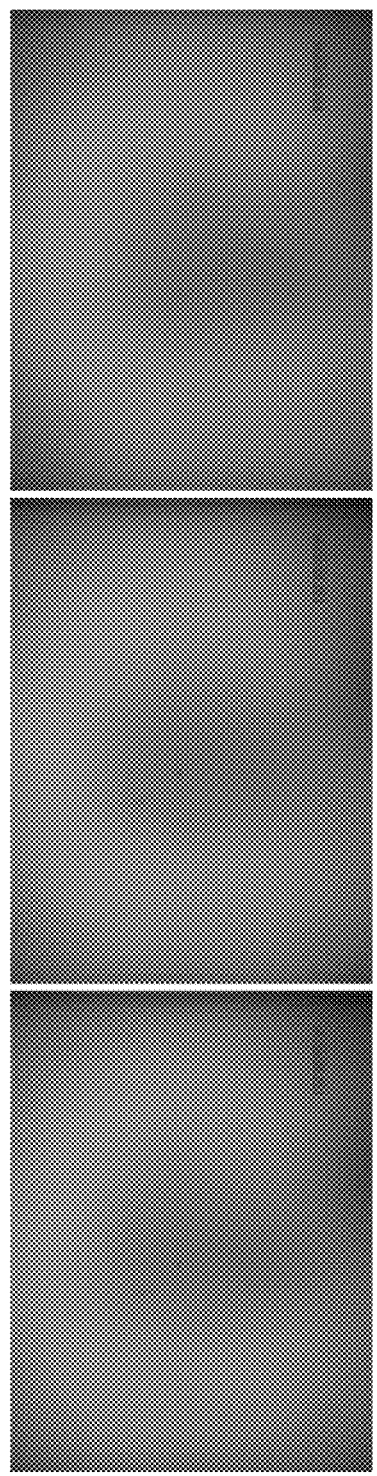
FIG. 15 is a series of three images of the empty bed that are used for modeling the background.

FIG. 15 is a series of three images of the empty bed that are used for modeling the background. These images, while appearing to be monochrome, are actually color images.

Figure 16:
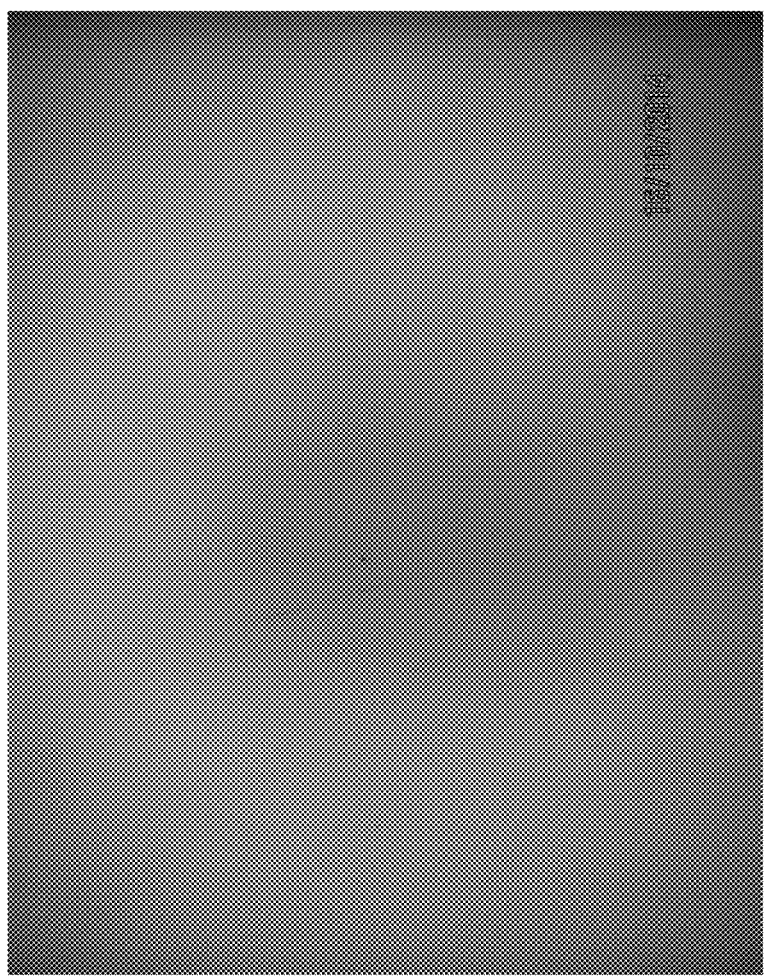
FIG. 16 is the average image derived from the images of FIG. 15.

The Gaussian pdf is defined by its mean $\mu$ and variance $\sigma^2$. A fast and memory-efficient way of computing the mean and variance of every pixel consists of using recurrence formulas. Using the three images shown in FIG. 15 the computing device determines an average image of the background, that is, the image representing the estimated $\mu$ of each Gaussian pdf. FIG. 16 is the average image derived from the images of FIG. 15.

Once the Gaussian pdf of the background estimated for each pixel using a series of images of the background, a simple per-pixel binary classifier can be devised for the detection of the foreground, as follows:

$$C(p_i) = \begin{cases} 1 & \text{if } p_i < \mu_i - 3\sigma_i - \tau \\ 0 & \text{otherwise} \end{cases}$$

where $C(p_i)$ is the classifier evaluated for pixel value $p_i$, $\mu_i$ and $\sigma_i$ are respectively the mean and standard deviation of the Gaussian pdf estimated for pixel i, and $\tau$ is an additional global background/foreground separation threshold which ensures a stable classification when in presence of disturbances (such as semi-opaque particles like wet dirt) or when the background model is poorly estimated (few number of training images). The classifier C evaluates at 1 for foreground pixels, and 0 for background pixels. This classifier effectively combines a hybrid approach between a constant thresholding approach and a statistical separation. With 8-bit grayscale images, the computing device uses a value of 30 for T.

Figure 17:
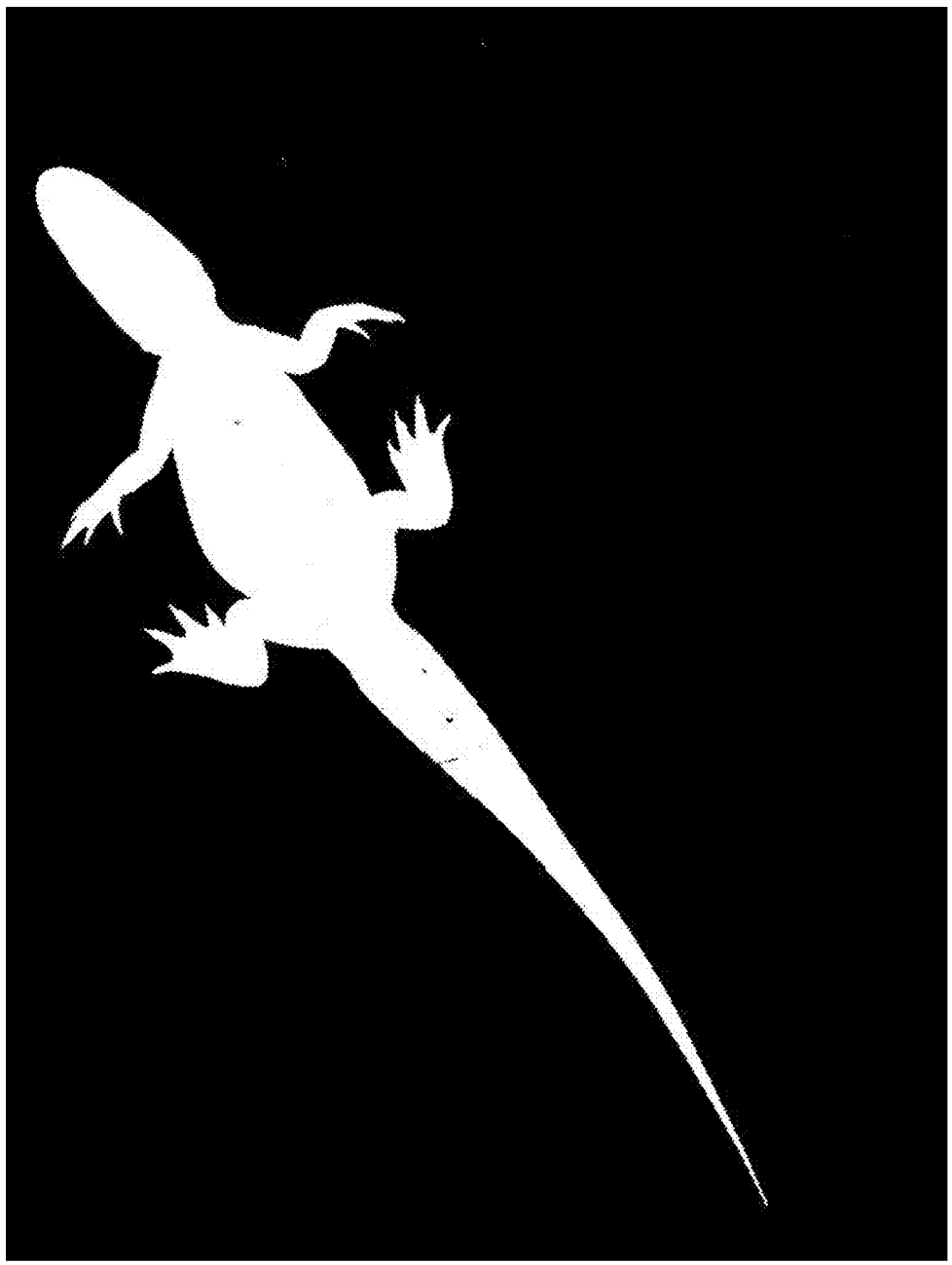
FIG. 17 is a valuation of the classifier for the alligator shown in FIG. 14 and trained using the three background images displayed in FIG. 15.
Figure 18B:
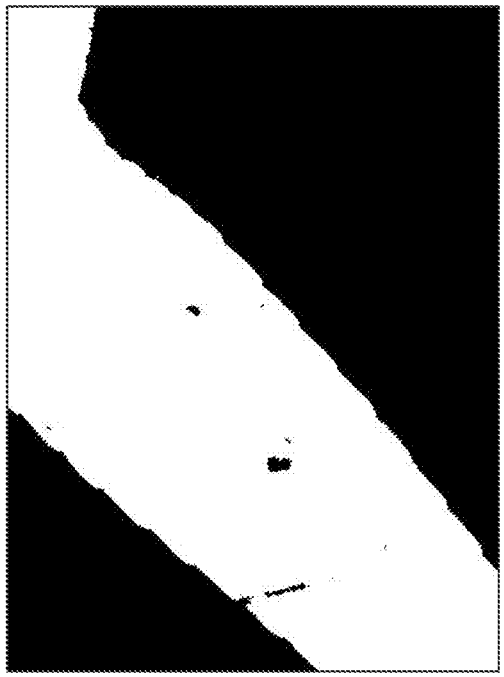
FIG. 18B is a detailed image of the valuation of FIG. 17 where alligator pixels are classified as part of the background.
Figure 18A:
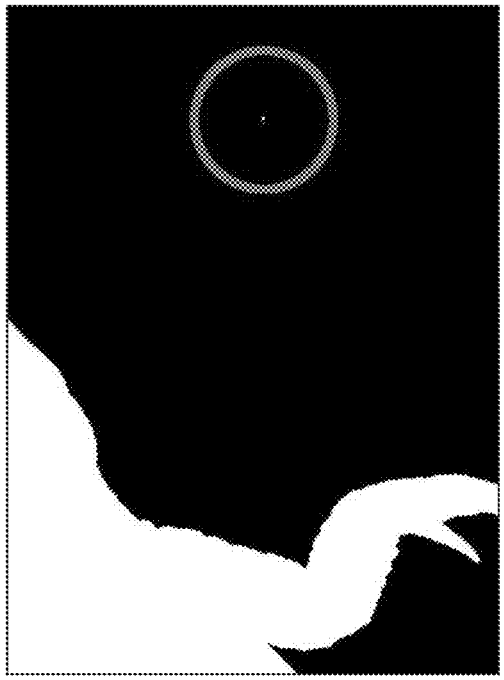
FIG. 18A is a detailed image of the valuation of FIG. 17 where small non-alligator regions are identified as foreground pixels.

Using the techniques described above, FIG. 17 is a valuation of the classifier for the alligator shown in FIG. 14 and trained using the three background images displayed in FIG. 15. As shown in FIG. 17, the foreground segmentation step produces a binary image essentially classifying pixels that belong to an alligator versus the backlit bed. The binary image is not free from anomalies (as shown in FIG. 18A where small regions can be identified as foreground pixels), and alligator pixels can be classified as part of the background thereby producing holes in the alligator silhouette (as shown in FIG. 18B).

These anomalies can be readily eliminated by using a technique that consists of identifying all blobs of foreground pixels and retaining the largest one. This approach makes the assumption that the alligator silhouette is always larger than the artifacts that the process is trying to eliminate; which is reasonable as it is not expected that the platform is heavily soiled. Note that multiple alligators can be present at once on the platform, thereby leading to multiple large blobs of foreground pixels—for which a simple remedy would be to only eliminate small blobs while retaining all the large ones.

The blob identification process is referred to as the connected-component labelling problem. Many different algorithms exist for connected-component labelling with the simplest ones often being the slowest. It is important to quickly perform this step such that the computing device can rapidly determine whether an alligator is present in the field of view or not, therefore in one embodiment the computing device uses a block-based algorithm—which is orders of magnitude faster than other implementations.

Figure 19:
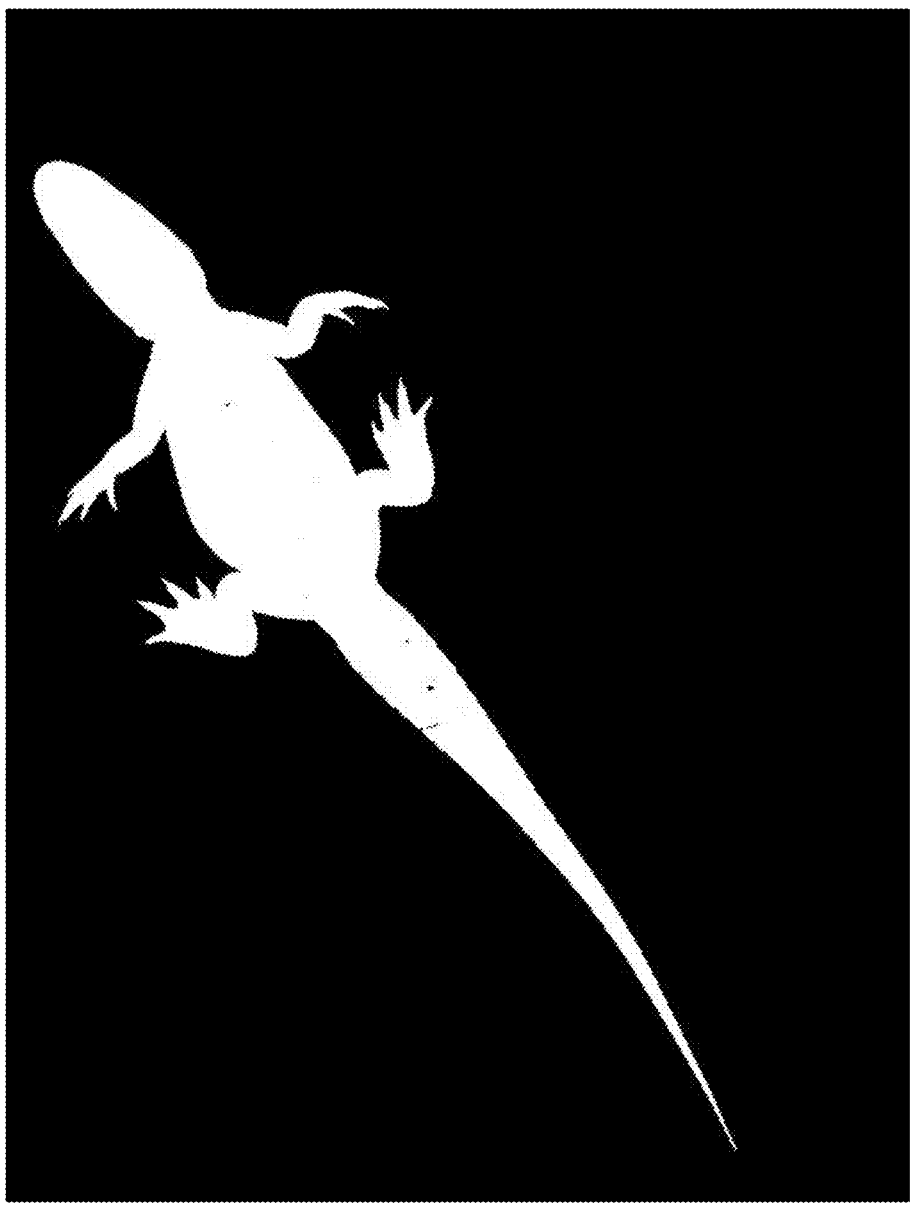
FIG. 19 is an image showing the largest blob found in the valuation using a connected-component labeling technique.

FIG. 19 is an image showing the largest blob found using the connected-component labeling technique; the small particles are discarded, effectively sorting out the alligator silhouette from the anomalies. It should be noted that the holes do not need to be filled in, as they have almost no impact on the rest of the process.

The previous step has given us the blob of pixels making up the silhouette of the alligator. Next, the computing device proceeds to identify the silhouette to determine the position of the head, tail, and eventually other body parts so that the device can perform measurements of the body parts. Because the computing device processes the silhouette of the animal, pixels that are inside the outline of the blob cannot be told apart without additional context. It is clear that the outline of the silhouette carries most of the information regarding the pose of the animal. Therefore, in the rest of this process the computing device only manipulates and analyzes the contour of the silhouette.

Figure 20:
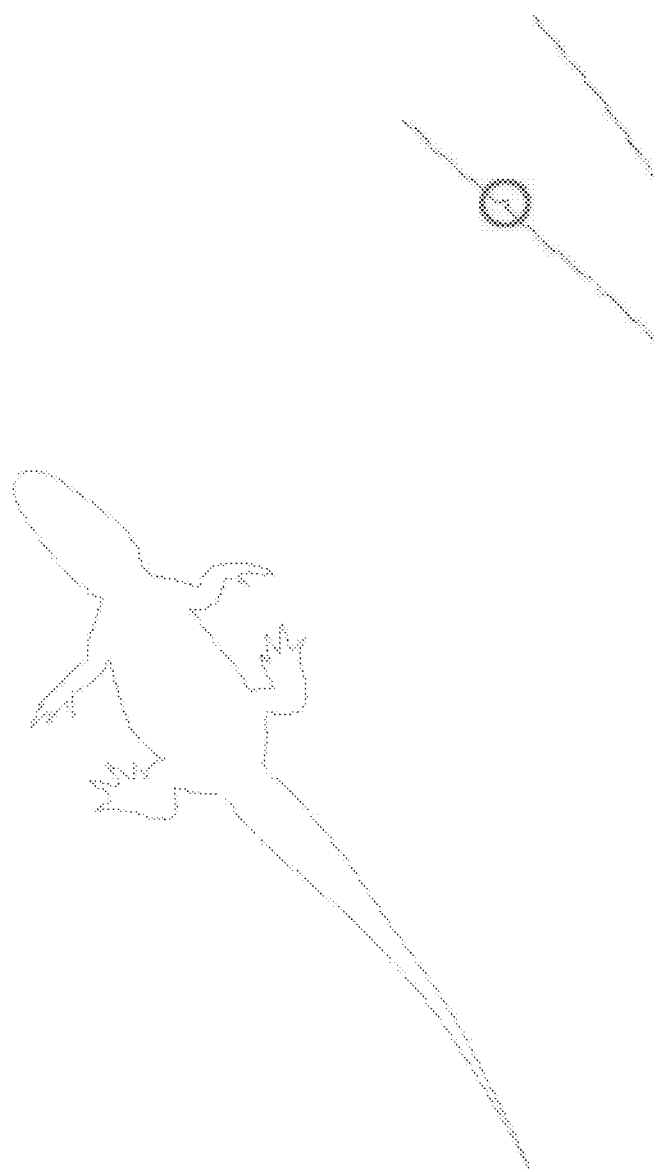
FIG. 20 is an image of the contour extracted from the image in FIG. 19.

Contour extraction is an image processing technique that can be implemented using a contour tracing algorithm and a four-neighbors search. FIG. 20 is an image of the contour extracted from the image in FIG. 19. The interior holes of the alligator blob have disappeared, as only the contour of the silhouette remains. Artifacts affecting the contour do remain as shown in the right-hand detail image of FIG. 20. The process includes a certain level of immunity to such artifacts affecting the contour as these artifacts inherently occur.

Figure 21:
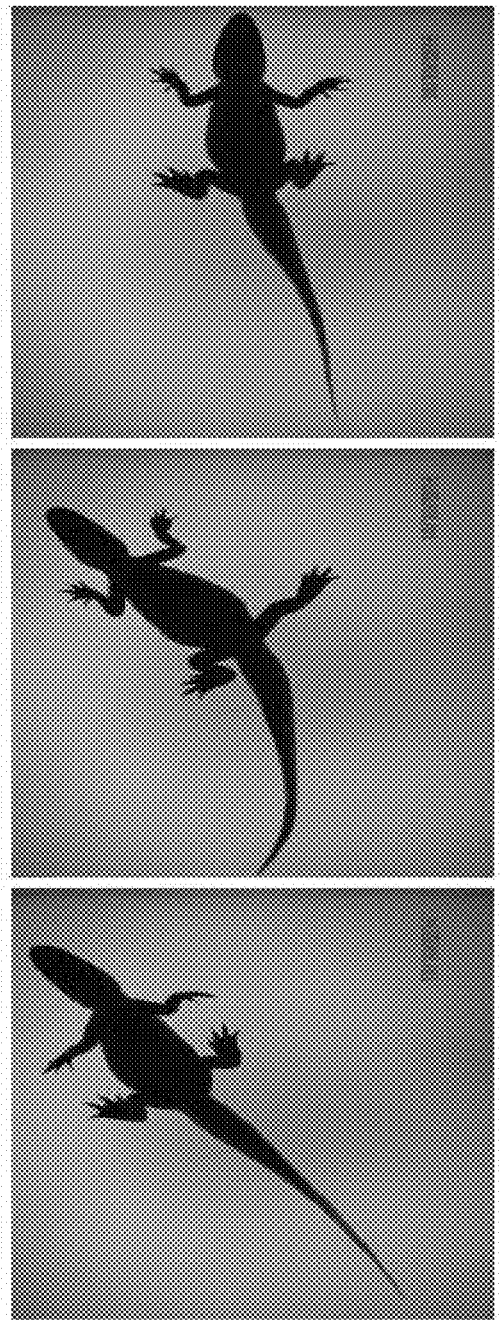
FIG. 21 is a series of images showing an alligator oriented in various directions and positions.

Identification of body parts from the contour of the alligator silhouette is a difficult task that is made more complicated by the alligator roaming freely on the bed, and therefore potentially being imaged in any pose. For example, the alligator can be oriented in any direction, have its head turned on either side, have a straight tail or curled up, and its limbs can be spread on its side or in any walking configuration (as shown in the images of FIG. 21).

Despite the variety of apparent silhouettes of an alligator that can be captured, the central body generally does not flex much on either side, and the head is typically turned left or right by no more than about ten degrees with respect to the body axis (though an alligator can turn its head far more severely, e.g., during a death roll the head may turn more than sixty degrees. Therefore, observations indicate that an alligator's body and head are generally in a stable configuration and the alligator's contour can be transformed into a systematic, pre-determined orientation—called the 'canonical' orientation. In some embodiments, the computing device arbitrarily chooses the canonical orientation to be: a horizontal body axis with the head facing left.

The computing device then calculates the coordinate transform that maps the contour points of the silhouette into the canonical orientation. Note that no proper identification of the body parts has yet occurred. The computing device can solve this problem using the first moment of inertia of the silhouette as well as the principal axis obtained through a principal component analysis (PCA) of the silhouette. The underlying idea is: if the principal direction of the silhouette is calculated, then there is a means to roughly align the silhouette horizontally. Once the animal body axis is aligned horizontally, then it should face left to enforce the convention. This can easily be done as follows: if after alignment the first moment of inertia of the silhouette is to the right to the first moment of inertia of the contour, then the contour is rotated again by 180 degrees—the reason being that the head and main body are more massive than the tail, therefore the first moment of inertia of the silhouette is always closer to the main body part than the first moment of inertia calculated from the contour points alone.

The principal direction of the silhouette can be obtained as follows: the eigenvector corresponding to the dominant eigenvalue of the coordinate covariance matrix of all the points in the silhouette is the principal direction of the silhouette. Let $s_i=(x_i,y_i)^t$ be a point of the silhouette, the covariance matrix C of these n points is defined as:

$$C = \sum_{i=1}^{n} s_i^t s_i = \begin{pmatrix} \sum_{i=1}^{n} x_i^2 & \sum_{i=1}^{n} x_i y_i \\ \sum_{i=1}^{n} x_i y_i & \sum_{i=1}^{n} y_i^2 \end{pmatrix}$$

The eigen-decomposition of the symmetric positive definite 2×2 matrix C gives two eigenvalues e1 and e2, and their corresponding eigenvectors v1 and v2. The eigenvector corresponding to the largest eigenvalue is the principal direction of the silhouette; let's call it v:

$$v = \begin{cases} v_1 & \text{if } e_1 > e_2 \\ v_2 & \text{otherwise} \end{cases}$$

By normalizing v into a unit-length vector $\bar{v}=v/\|v\|_2$, where $\|\cdot\|_2$ is the 2-norm also called Euclidean length, and noting $\bar{v}=(\bar{v}_x,\bar{v}_y)^t$, the two-dimensional rotation matrix A aligning the silhouette horizontally is defined as:

$$A = \begin{pmatrix} \bar{v}_x & \bar{v}_y \\ -\bar{v}_y & \bar{v}_x \end{pmatrix}$$

Figure 22:
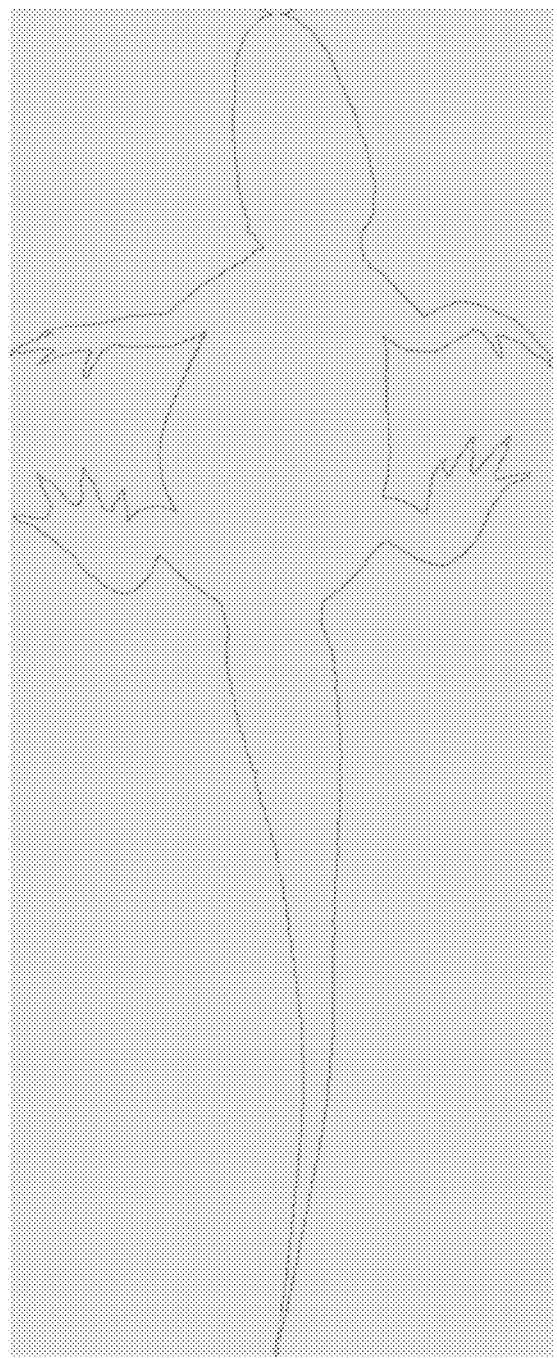
FIG. 22 is an image depicting the result of rotation of the contour points by a rotation matrix A.

FIG. 22 is an image depicting the result of the rotation of the contour points by the rotation matrix A. Notice how the alligator is roughly aligned horizontally but facing right, which is contrary to the convention described above; the next step corrects this.

Figure 23:
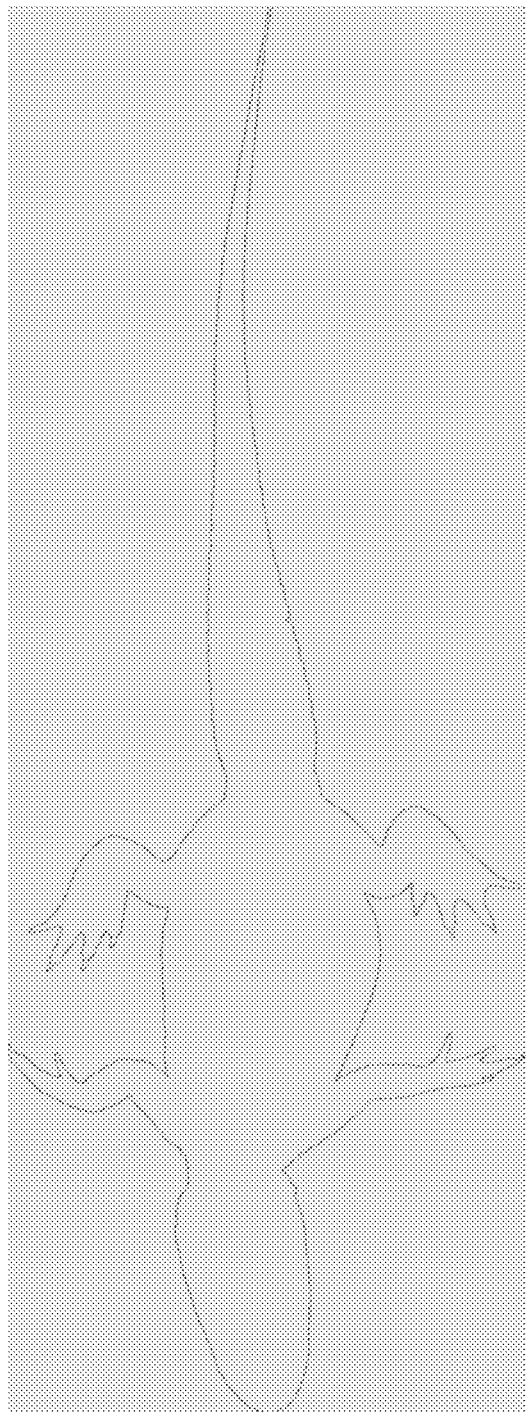
FIG. 23 is an image depicting the result of additional rotation of the contour.

Now that the contour of the silhouette is aligned horizontally, the computing device processes the contour to face left, the arbitrary convention. Using the observation that the alligator is more massive towards the head and body than the tail, the computing device calculates the first moment of inertia of the silhouette pixels (likely close to the actual center of gravity of the animal) and the first moment of inertia of the contour pixels. If the first moment of inertia of the silhouette is not to the left of the first moment of inertia of the contour, the computing device determines that the alligator is facing right and an additional 180 degree rotation is performed. FIG. 23 is an image depicting the result of such additional rotation.

Figure 24:
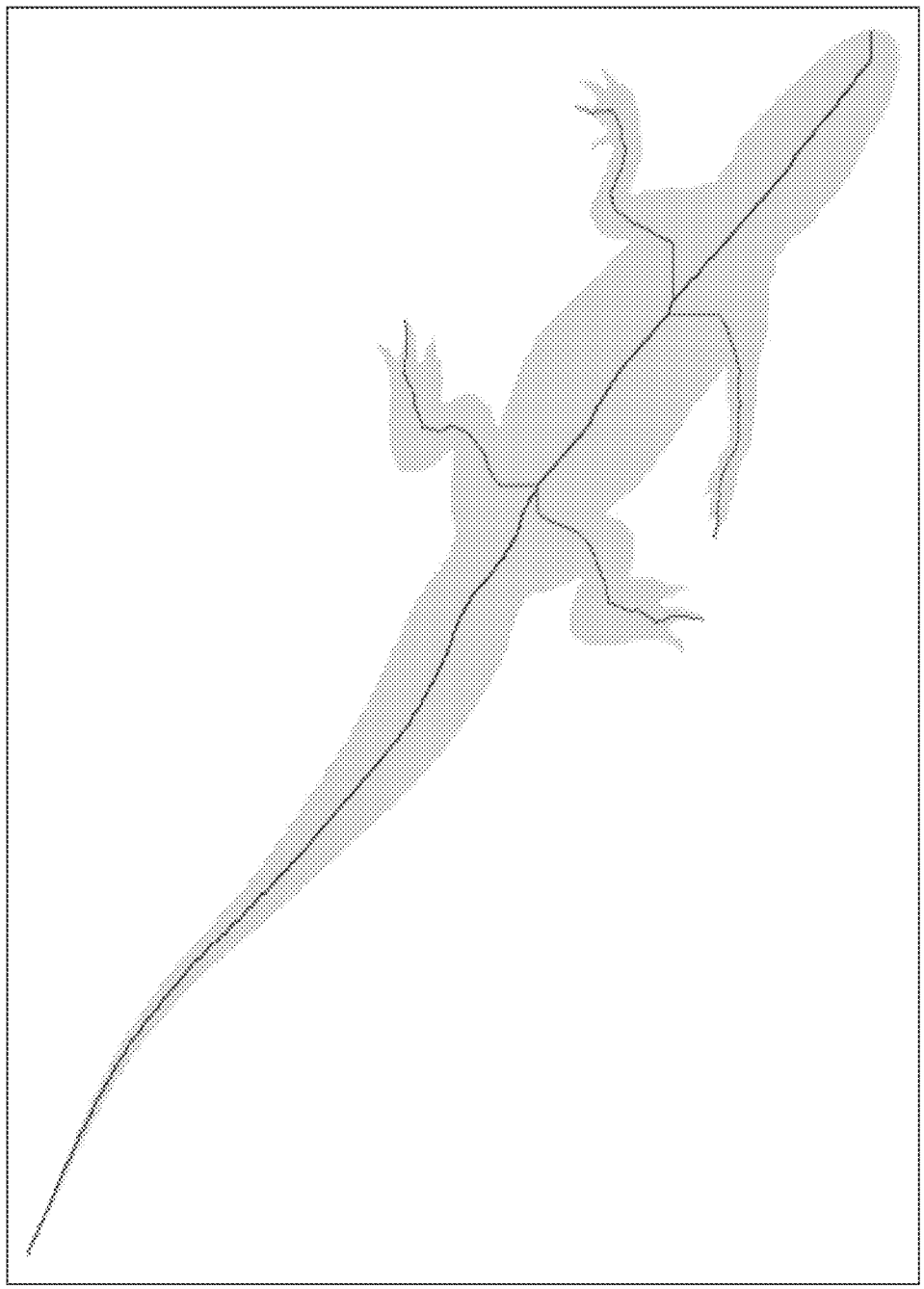
FIG. 24 an image depicting measurements of the contour.

FIG. 24 is an image showing the final step in the measurement process. As set forth above, the processing produces zero or more blobs that represent the probable silhouette of alligators. The computing device now analyzes each of these blobs to retain only those blobs that are truly shaped liked an alligator. To this end, the computing device combines several techniques based on the contour of the blob, the blob itself, and the medial axis transformation of the blob, also called "skeletonization."

From this analysis, the centerline that stems from the tip of the head and end at the tip of the tail, passing through the middle of the body, is identified. The computing device performs a similar process for identifying limbs of the alligator. The computing device performs tests to ensure the blob has the body characteristics of an alligator before the centerline is converted to a metric length. As shown in FIG. 24, the centerline, the front limbs, and the back limbs are properly identified.

The sequence of images in FIGS. 14-24, therefore, is an illustration of the principal concepts that compose the measurement and weighting algorithm executed by the processor of the computing device housed in the camera box 102. It should be appreciated that the above processing steps can be executed by one or more other computing devices that are communicably coupled to the sensor 202.

In some embodiments, the hardware and software that provides for manipulation of digital images as described above is built into a computing device within the camera box 102 of the chute assembly 100. For example, the computing device can be a quad-core single board computer. The image capture and analysis algorithms described above are incorporated into image processing software that is loaded onto each single board computer. Accordingly, once the sensor captures an image, the image processing is completed on the single board computer. In some embodiments, the computing time for the image capture and processing described for each alligator is approximately thirty seconds.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A chute assembly for capturing images of an alligator, the chute assembly comprising:
    a base;
    a ceiling;
    a plurality of guides connecting the base and the ceiling, each guide comprising a support attached to the base and a concentric, free-moving cylinder attached to the ceiling;
    a bed attached to the plurality of guides and positioned between the ceiling and the base, the bed including one or more floats attached to an underside of the bed, wherein the floats operate to keep the bed at a waterline when the chute assembly is placed into a water tank; and
    a camera box attached to the ceiling, the camera box comprising an imaging device coupled to a processor and a memory, the imaging device operable to capture images of the bed.

2. The chute assembly of claim 1, wherein the bed includes one or more lights that illuminate a surface of the bed.

3. The chute assembly of claim 1, wherein the processor is configured to process the images to extract a silhouette of an alligator in the images, determine a contour of the silhouette, transform the contour to a predetermined position and/or rotation, and determine one or more dimensions of the alligator based upon the transformed contour.

4. The chute assembly of claim 3, wherein the predetermined position and/or orientation is a horizontal body axis with a head of the alligator facing left.

5. A computerized method for determining one or more dimensions of an alligator based upon an image, the method comprising:
    capturing, by a sensor coupled to a computing device being housed in a camera box of a chute assembly, an image of an alligator positioned on an illuminated bed of the chute assembly;
    extracting, by the computing device, a portion of the image that corresponds to a silhouette of the alligator;
    determining, by the computing device, a contour of the silhouette;
    transforming, by the computing device, the contour to a predetermined position and/or rotation; and
    determining, by the computing device, one or more dimensions of the alligator based upon the transformed contour.

6. The method of claim 5, wherein the predetermined position and/or rotation comprises a horizontal body axis with a head of the alligator facing left.

7. The method of claim 5, wherein the contour of the silhouette is determined by classifying one or more pixels of the image that belong to the alligator, classifying one or more pixels of the image that belong to the illuminated bed, and extracting the contour based upon the classified pixels.

8. The method of claim 5, wherein the contour is transformed by aligning the contour horizontally, determining a first moment of inertia of silhouette pixels, determining a first moment of inertia of contour pixels, and rotating the contour 180 degrees if the first moment of inertia of the silhouette pixels is not to the left of the first moment of inertia of the contour pixels.

9. The method of claim 5, wherein the one or more dimensions comprise a length of the centerline of the alligator, a width of the alligator, and a length of one or more limbs of the alligator.

10. The method of claim 5, further comprising determining, by the computing device, a weight of the alligator based upon the dimensions.

* * * * *